United States Patent
Shawgo et al.

(10) Patent No.: US 10,697,893 B2
(45) Date of Patent: Jun. 30, 2020

(54) SPECULAR VARIABLE ANGLE ABSOLUTE REFLECTANCE METHOD AND REFLECTOMETER

(71) Applicant: The Boeing Company, Chicago, IL (US)

(72) Inventors: Loyal Bruce Shawgo, O'Fallon, MO (US); Jeffery Thomas Murphy, Troy, MO (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 15/916,515

(22) Filed: Mar. 9, 2018

(65) Prior Publication Data

US 2019/0277760 A1   Sep. 12, 2019

(51) Int. Cl.
*G01N 21/55* (2014.01)
*G01N 21/43* (2006.01)
(Continued)

(52) U.S. Cl.
CPC .............. *G01N 21/55* (2013.01); *G01N 21/43* (2013.01); *G01N 21/63* (2013.01); *G01N 21/21* (2013.01);
(Continued)

(58) Field of Classification Search
CPC ........ G01N 21/55; G01N 21/63; G01N 21/43; G01N 2021/557; G01N 2021/558; G01N 2021/218
See application file for complete search history.

(56) References Cited

U.S. PATENT DOCUMENTS 3,402,631 A * 9/1968 Potter .................... G01N 21/21
356/36
4,505,586 A * 3/1985 Tochigi .................. G01N 21/65
356/301
(Continued)

FOREIGN PATENT DOCUMENTS

JP    1023527 A    9/1998
RU    2018122 C1   8/1994

OTHER PUBLICATIONS

"Variable Angle Reflection Accessory," Harrick Scientific Products, accessed Mar. 7, 2018, 1 page. http://www.harricksci.com/ftir/accessories/group/Variable-Angle-Reflection-Accessory.
(Continued)

*Primary Examiner* — Sang H Nguyen
(74) *Attorney, Agent, or Firm* — Yee & Associates, P.C.

(57) ABSTRACT

A specular variable angle absolute reflectometer. The device includes a light source and a mirror system in a light path of the light source. The mirror system is configured to reflect a light beam from the light source towards a sample that is optically reflective. The device also includes a roof mirror disposed in the light path after the sample. The roof mirror is configured to reflect the light beam back towards the sample. The device also includes a mechanism connected to the roof mirror. The mechanism is configured to rotate the roof mirror about an axis of the sample. The device also includes a detector in the light path after the roof mirror such that the detector receives light that has been reflected from the roof mirror, thence back to the sample, thence back to the mirror system, and thence to the detector.

18 Claims, 15 Drawing Sheets

(51) Int. Cl.
    *G01N 21/63* (2006.01)
    *G01N 21/21* (2006.01)
    *G01N 21/39* (2006.01)
    *G01N 21/84* (2006.01)
    *G01N 21/94* (2006.01)

(52) U.S. Cl.
    CPC ............ *G01N 21/39* (2013.01); *G01N 21/94* (2013.01); *G01N 2021/218* (2013.01); *G01N 2021/557* (2013.01); *G01N 2021/558* (2013.01); *G01N 2021/8427* (2013.01)

(56) References Cited

U.S. PATENT DOCUMENTS

| | | | | |
|---|---|---|---|---|
| 4,844,617 | A * | 7/1989 | Kelderman | G01B 9/04 356/624 |
| 4,872,755 | A * | 10/1989 | Kuchel | G01J 9/02 356/495 |
| 4,896,952 | A * | 1/1990 | Rosenbluth | G02B 17/008 359/638 |
| 5,471,981 | A * | 12/1995 | Wiggins | G01J 1/44 356/39 |
| 6,094,210 | A * | 7/2000 | Cobb | G02B 7/28 347/241 |
| 6,377,349 | B1 * | 4/2002 | Fercher | G01B 11/2441 356/479 |
| 6,532,321 | B1 * | 3/2003 | Zhang | G02B 6/2746 372/703 |
| 6,909,549 | B1 * | 6/2005 | Hsieh | G02B 6/2713 359/489.07 |
| 2003/0048441 | A1 * | 3/2003 | Manning | G01J 3/453 356/326 |
| 2005/0006590 | A1 * | 1/2005 | Harrison | G01J 3/02 250/372 |
| 2005/0185193 | A1 * | 8/2005 | Schluchter | G03F 7/70775 356/498 |
| 2015/0185135 | A1 * | 7/2015 | Martino | G01N 21/211 356/369 |
| 2016/0146722 | A1 * | 5/2016 | Koerner | G01N 21/211 356/301 |

OTHER PUBLICATIONS

"Near-Normal and Large Angle Regular Reflectance Calibrations," National Physical Laboratory, accessed Mar. 7, 2018, 3 pages. http://www.npl.co.uk/server.php?show=ConWebDoc.1118.

"Absolute Reflectance Accessory," Pike Technologies, accessed Mar. 7, 2018, 2 pages. https://www.piketech.com/SR-Absolute-Reflectance-Accessory.html.

Storm, "Absolute Specular Reflectance Measurements at Fixed Angles," Labsphere Corp., Application Note No. 4, Feb. 1998, 4 pages.

"Absolute Calibration of Regular Reflectance Standards for the Thermal Infrared Region," accessed Mar. 7, 2018, 3 pages. http://www.npl.co.uk/optical-radiation-photonics/optical-characterisation-of-materials/products-and-services/absolute-calibration-of-regular-reflectance-standards-for-the-thermal-infrared-region.

"Comparison of Absolute Reflectance Methods: VW vs Reflectance Relative To A Standard," Harrick Scientific Products, No. 21149, received Mar. 7, 2018, 2 pages.

"The Variable Angle Reflection Accessory," Harrick Scientific Products Inc., Oct. 12, 2004, 2 pages. http://www.harricksci.com/accessories/H_variableanglereflectionaccessory.cfm.

European Patent Office Extended Search Report, dated Apr. 26, 2019, regarding Application No. 19161557.4, 14 pages.

Nijnatten et al., "Directional Reflection Measurements on Highly Reflecting Coats," 7th International Conference on Coatings on Glass and Plastics, Jun. 19, 2007, The Netherlands, 7 pages.

Castellini et al., "Characterization and Calibration of a Variable-Angle Absolute Reflectometer," Applied Optics, Feb. 1, 1990, New York, New York, vol. 29, No. 4, 6 pages.

* cited by examiner

SPECULAR VARIABLE ANGLE ABSOLUTE REFLECTANCE METHOD AND REFLECTOMETER

BACKGROUND INFORMATION

1. Field

The present disclosure relates to methods and devices for specular variable angle absolute reflectance.

2. Background

Specular reflectance refers to the reflection of light from a surface, such as a mirror, in which light from an incoming direction is reflected into an outgoing direction. Thus, specular reflectance is a behavior of light which can be measured using optical equipment.

Precise absolute measurement of specular reflectance has several applications. For example, this technique is used to establish reference standards for other types of reflectance measurements and for calibration of optical measurement devices. In another example, this technique is used in the optical coating industry to develop coatings, for example, mirrors in order to increase the mirror's optical efficiency. In still another example, precise absolute measurement of specular reflectance can be used to measure the thickness or refractive index of a single layer of an optical coating.

However, measurement of absolute specular reflectance is difficult when it is desirable to quickly test a broad range of incident angles, light wavelengths, and light polarizations. Thus, improved techniques for measuring absolute specular reflectance are desirable.

SUMMARY

The illustrative embodiments provide for a specular variable angle absolute reflectometer. The specular variable angle absolute reflectometer includes a light source and a mirror system in a light path of the light source. The mirror system is configured to reflect a light beam from the light source towards a sample that is optically reflective. The specular variable angle absolute reflectometer also includes a roof mirror disposed in the light path after the sample. The roof mirror is configured to reflect the light beam back towards the sample. The specular variable angle absolute reflectometer also includes a mechanism connected to the roof mirror. The mechanism is configured to rotate the roof mirror about an axis of the sample. The specular variable angle absolute reflectometer also includes a detector in the light path after the roof mirror such that the detector receives light that has been reflected from the roof mirror, thence back to the sample, thence back to the mirror system, and thence to the detector.

The illustrative embodiments also provide for a method of measuring a reflectance of a sample having a sample axis. The method includes projecting a light beam from a light source towards a mirror system. The method also includes thereafter reflecting the light beam from the mirror system towards the sample. The sample is rotated by a first angle about the sample axis. The method also includes, thereafter, reflecting the light beam from the sample towards a roof mirror, the roof mirror rotated by a second angle about the sample axis. The second angle is about twice the first angle. The method also includes, thereafter, reflecting the light beam from the roof mirror back towards the sample. The method also includes, thereafter, reflecting the light beam from the sample back towards the mirror system. The method also includes, thereafter, reflecting the light beam from the mirror system towards a detector, whereby a modified light beam is generated. The method also includes calculating the reflectance of the sample based on optical properties of the modified light beam as detected by the detector.

The illustrative embodiments also provide for a method of using a specular variable angle absolute reflectometer comprising a light source; a mirror system in a light path of the light source, the mirror system configured to reflect a light beam from the light source towards a sample that is optically reflective; a roof mirror disposed in the light path after the sample, the roof mirror configured to reflect the light beam back towards the sample; a mechanism connected to the roof mirror, the mechanism being configured to rotate the roof mirror about an axis of the sample; and a detector in the light path after the roof mirror such that the detector receives light that has been reflected from the roof mirror, thence back to the sample, thence back to the mirror system, and thence to the detector. The method includes removing the sample and verifying that a sample holder does not restrict the light beam. The method also includes aligning the roof mirror to a 100% configuration. The method also includes measuring a signal at the detector to form a 100% measured value. The method also includes measuring a total light source power at the detector. The method also includes, thereafter, moving a mirror system so that the light beam is projected into a light trap to interrupt the light source. The method also includes, thereafter, measuring a background noise at the detector. The method also includes, thereafter moving the mirror system back to receive the light beam. The method also includes replacing the sample into the path of the light beam. The method also includes rotating the sample to a desired incident angle. The method also includes rotating the roof mirror to a complimentary reflection angle. The method also includes measuring a sample reflection at the detector to form a measured value. The method also includes measuring a total light source power at the detector. The method also includes, thereafter, moving a mirror system so that the light beam is projected into a light trap to interrupt the light source. The method also includes, thereafter, measuring a background noise at the detector. The method also includes, thereafter, moving the mirror system back to receive the light beam. The method also includes calculating a reflectance of the sample as a ratio of the 100% measured value with background compensation. The method also includes calculating an absolute reflectance of the sample as the square root of the reflectance to the 100% measured value.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

Figure 1A:
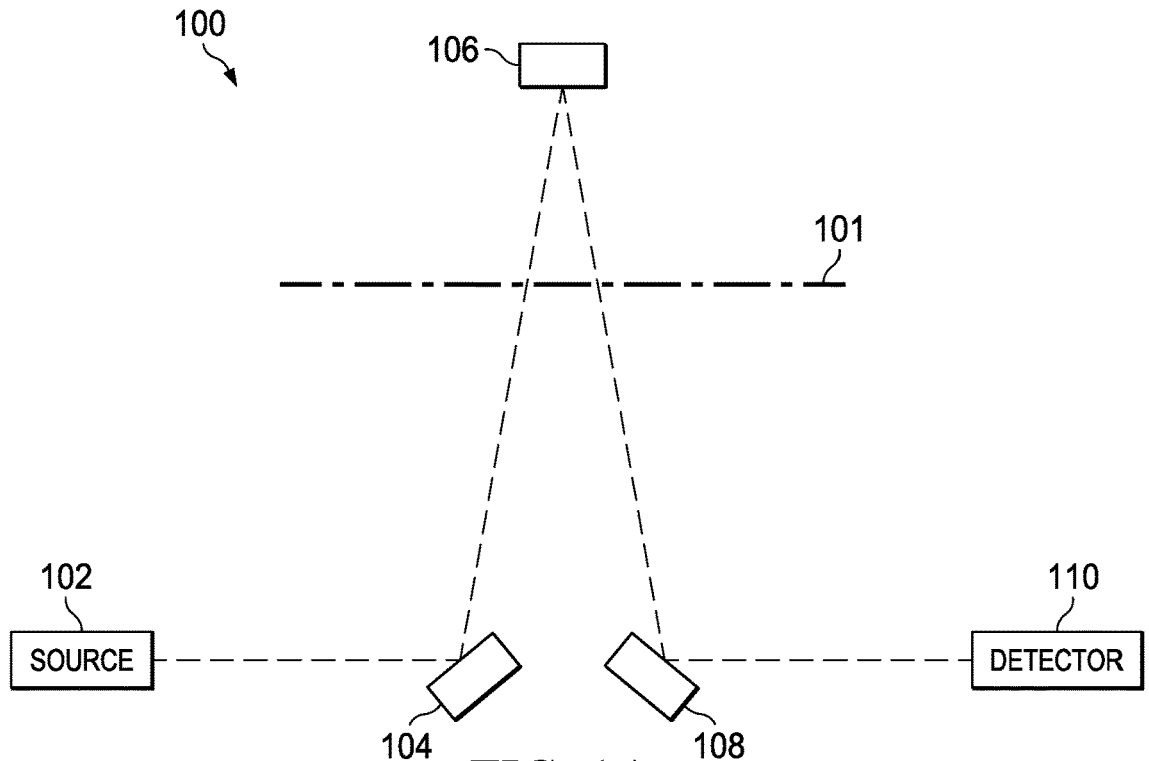
FIG. 1A illustrates a prior art a 10 degree "V" configuration optical path for performing a 100% reflectance measurement.

The illustrative embodiments recognize and take into account that precise absolute measurement of specular reflectance has several applications. First, and perhaps most widely used, this technique is used to establish reference standards for other types of reflectance measurement and for calibration of measurement devices. Most measurement instruments require a known reflectance standard to establish the baseline system throughput or the 100% reflectance level. In other words, the 100% reflectance level is defined as the reflectance measured when the sample is not measured; or, the reflectance of only the components in the reflectometer. Not all of the known measurement systems use the same incident angle, some are variable.

The illustrative embodiments recognize and take into account that these known techniques depend on reference standards with variable wavelength, angle of incidence of the light beam, and polarization capability of the reflectometer. Thus, the specular variable angle absolute reflectometer (SVAAR) of the illustrative embodiments provide for an absolute measurement technique and reflectometer that can establish those levels independent of any reference standards with variable wavelength, angle of incidence, and polarization capability.

The illustrative embodiments also recognize and take into account that another application is in the optical coating industry. For instance, laser mirrors require very efficient, highly reflective coatings to maximize reflectance and minimize heating due to absorption. These high efficiency mirror coatings are typically multi-layer dielectric stacks designed for a specific incident angle and perhaps for a specific wavelength of light. Dielectric coatings can vary in performance from their original design due to uncertainties in the thickness or composition of each coating layer. These variations in thickness or composition can affect the reflectance value and polarization of the reflected light.

Witness samples are typically included in each coating run and measured to verify that the coating batch meets the desired coating performance standards. Often laser mirror reflectivity is greater than 99.98% at a specific laser wavelength and design angle, although the mirror manufacturer or user may want to determine the absolute reflectance at angles and polarizations outside of the limited design angle (in the case of off the shelf mirror coatings used at a non-design angle). For this type of measurement, use of a reference standard with the added uncertainty would increase the coating measurement uncertainty. In addition, the reflectometer of the illustrative embodiments can characterize the polarization effects of the coating. The reflectometer of the illustrative embodiments also can support either broadband mirror measurement or measurement at specific wavelengths, including laser lines along with multiple angles and polarizations.

The illustrative embodiments also recognize and take into account that one other application is in the measurement of single layer coating thickness or refractive index. One technique for measuring contamination in vacuum chambers is to place a reflective witness sample in the vacuum chamber during some process or procedure. For example, during satellite testing, often components give off volatile substances when under vacuum, particularly when heated, such as during a thermal or operational test. Contaminants condense on the mirrored witness sample during the procedure. The witness samples could be measured in the reflectometer of the illustrative embodiments, and the contaminant layer thickness or refractive index derived from the reflected polarization changes at specific angles and wavelengths.

The illustrative embodiments also recognize and take into account that reflectance or transmittance measurement of materials is one way of determining the composition or other chemical, thermal or optical characteristics of a test substance. The illustrative embodiments specifically contemplate the measurement of various properties at optical (visible, near visible) or infrared (often called thermal infrared) wavelengths of light. Typically, optical measurements are the ratio of the test sample amplitude to that of a known, well characterized 'reference' or 'standard' or 'reference standard' workpiece. However, the accuracy of these relative measurements is limited to the accuracy of the 'reference standard', which, in many cases, was calibrated against other 'reference standards'. Each level of the calibration process adds uncertainty to the accuracy of our working 'reference standard', often resulting in large uncertainties. Accordingly, in some cases, the 'reference standard' becomes nearly useless. As an example, if a purchased reference standard had an accuracy with an uncertainty of +/−4%, the reference standard would not help in making a measurement with a +/−1% measurement accuracy.

The illustrative embodiments also recognize and take into account that, ideally, 'reference standards' used in optical measurement would be measured via an 'absolute' measurement technique which does not use a comparison to a known standard as the source of accuracy. The illustrative embodiments also recognize and take into account that there are techniques currently used to measure reflectance using 'absolute' techniques, but they have practical limitations. One major limitation is in the range of incident angles that the technique covers. Other limitations of known techniques include sample size that are too large for a given test, or system alignment problems.

Thus, the illustrative embodiments provide a measurement technique capable of accurately measuring an absolute reflectance of specular samples across a broad range of incident angles, wavelengths, and polarizations relatively quickly. The illustrative embodiments also provide for absolute reflectance measurements in infrared wavelengths. The illustrative embodiments also recognize and take into account that recognize and take into account that there are few, if any, absolute reflectance standards available at the thermal infrared wavelengths.

For most reflectance standards, reflectance versus angle and polarization is derived from the basic optical properties of the reflective material. For example, an optical system could use a polished copper plate for which basic optical properties are widely accepted, but not over the full range of calibration wavelengths. Extrapolation and interpolation of values from multiple sources are used in the derivation of reflectance versus wavelength, polarization, and angle. For such a system, it is also unclear what alloys of copper for which the accepted optical properties would be valid.

To summarize, the illustrative embodiments have several advantages over the known art. The illustrative embodiments can perform absolute reflectance measurements of specular samples at variable angles, polarizations, and wavelengths, whereas prior reflectometers cannot. One unique feature of the illustrative embodiments is the use of a roof mirror. The roof mirror can rotate about the sample rotation axis at twice the angular distance as the sample incidence. The sample rotation axis lies on the sample surface. The incident angle of light on the sample is measured relative to the sample normal (a line perpendicular to the sample surface).

A second unique feature of the illustrative embodiments is the roof mirror angle, which allows the first and second reflections from the sample to be coincident. A third unique feature of the illustrative embodiments is the ability to sequentially measure the sample, the laser power, and the background light level to compensate for source drift and background conditions. A fourth unique feature of the illustrative embodiments is that the measured foot print is limited to the extent of the beam diameter divided by the cosine of the incident angle. The beam can be focused at the detector to maximize signal and minimize alignment criticality. A fifth unique feature of the illustrative embodiments is that this measurement technique uses the same optical path and optical components during both the 100% measurement stage and the sample measurement stage. The ratio of the sample to the 100% is an absolute measure of the square of the sample reflectance.

Thus, the illustrative embodiments provide for a specular variable angle absolute reflectance method and reflectometer that has numerous advantages over the known art. Attention is now turned to the figures.

Figure 1B:
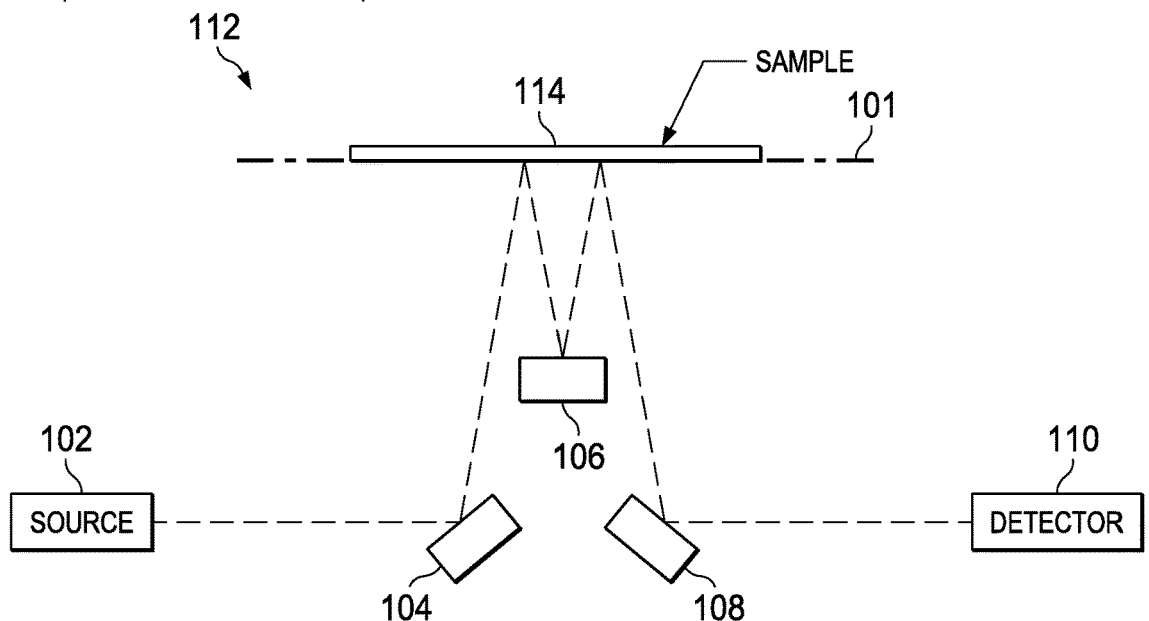
FIG. 1B illustrates a prior art 10 degree "W" configuration optical path for performing a reflectance measurement of a sample.

FIG. 1A illustrates a prior art a 10 degree "V" configuration optical path for performing a 100% reflectance measurement. FIG. 1B illustrates a prior art 10 degree "W" configuration optical path for performing a reflectance measurement of a sample. FIG. 1A and FIG. 1B should be read together. The lines in FIG. 1A and FIG. 1B show the light path, though dashed line 101 is an axis of sample 114.

The "V" configuration 100 shown in FIG. 1A is used to measure a 100% reflectivity of the optical reflectometer, which includes light source 102, mirror 104, and mirror 106, mirror 108, and detector 110. The term "100%" reflectivity is used because the sample is not present, and the sample would reduce reflectivity at least by a small amount when the sample is present in the reflectometer. Without a sample being present, the maximum possible reflectivity for the system is achieved, and this maximum possible reflected is considered "100% reflectivity", or simply "100%".

The "W" configuration 112 shown in FIG. 1B adds sample 114 into the reflectometer shown in FIG. 1A, in a "W" arrangement of the light path between sample 114 and mirror 106. The reflectivity of the system is calculated again and compared to the 100% reflectivity, thereby determining the reflectivity of sample 114.

Thus, FIG. 1A and FIG. 1B represent a known method for measuring the absolute reflectance of specular samples. This method is referred-to as the 'V-W' absolute reflectance measurement accessory, which is commercially available for many spectrophotometers and Fourier Transform Infrared (FTIR) measurement systems. The reason for the 'V' and 'W' name is fairly obvious from FIG. 1A and FIG. 1B, which show the '100%' and the 'Sample' measurement paths. The 'absolute' measurement capability is derived from the use of the same three mirrors used for the '100%' value in the 'V' configuration being used when measuring the sample in the 'W' configuration. Since the only change to the optical path is the addition of the sample, the ratio of the 'W'/'V' values are the absolute reflectance ratio directly attributable to the sample reflectance. Note, however, that there are two reflections or 'bounces' from the sample. Since the measured value is the result of $R_{sample}*R_{sample}$ then the Reflectance of the sample, or $R_{sample}$ is equal to the square root of ('W'/'V'). This relationship helps to increase the accuracy of the sample reflectance measurement.

Figure 2:
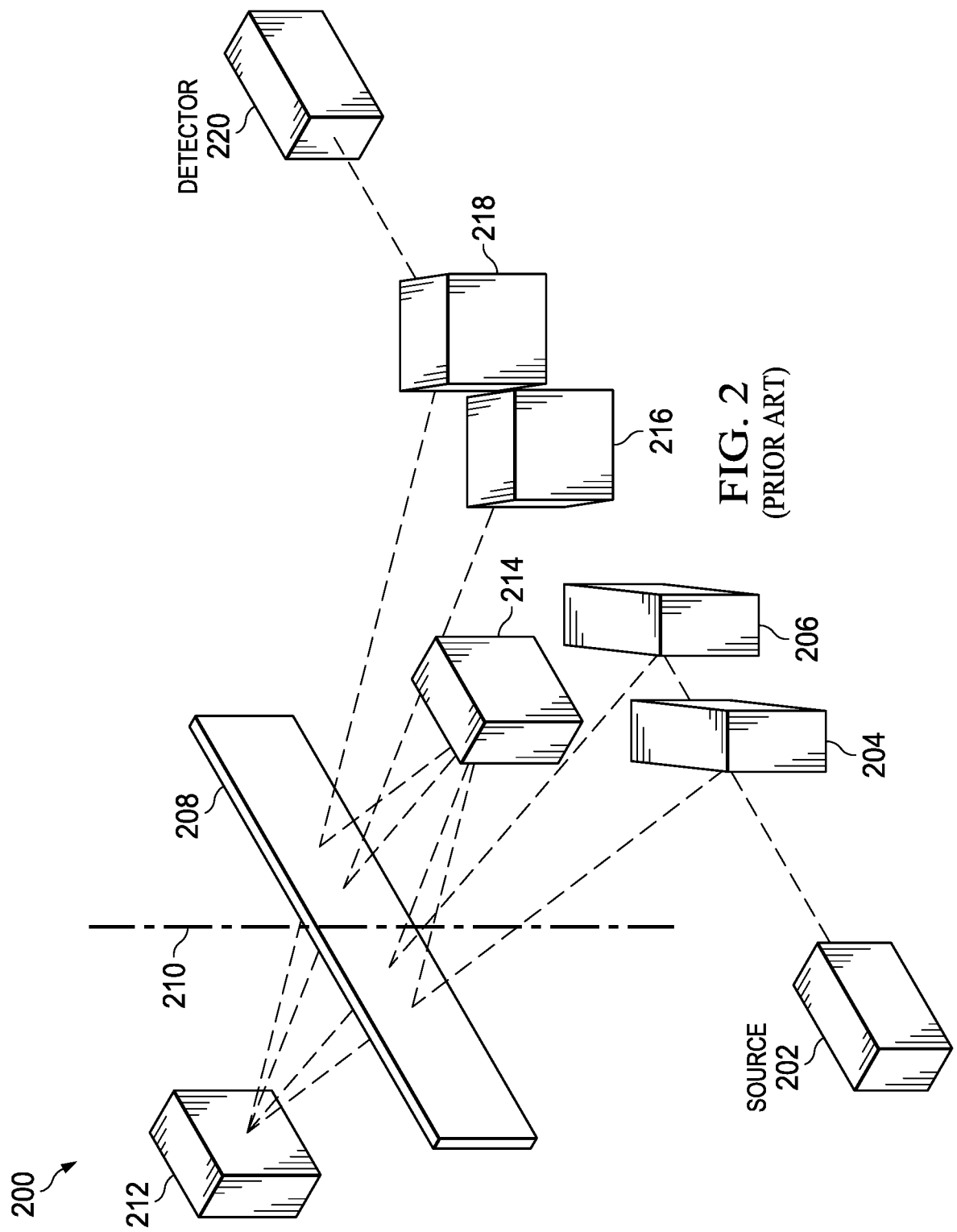
FIG. 2 illustrates a prior art overlaid "V-W" components and beam path for a 10 degree and a 20 degree angle of incidence for both 100% reflectance measurement and a sample reflectance measurement.

FIG. 2 illustrates a prior art overlaid "V-W" components and beam path for 10 degree and 20 degree angle of incidence for both 100% reflectance measurement and a sample reflectance measurement, in accordance with an illustrative embodiment. "V-W" arrangement 200 shown in FIG. 2 is a variation or a combination of "V" configuration 100 of FIG. 1A and "W" configuration 112 of FIG. 1B. The reflectometer of "V-W" arrangement 200 includes light source 202, mirror 204, mirror 206, sample 208, sample axis 210, mirror 212, mirror 214, mirror 216, mirror 218, and detector 220.

The technique described in FIG. 1A and FIG. 1B, as well as FIG. 2, is limited in its ability to vary the angle of incidence. Typically, the reflectometer is configured for a single incident angle of 10°+/− and is not intended to be varied. The sample incident angle is the degree which sample 208 is rotated about sample axis 210 relative to the incident light. Thus, the sample incident angle is the angle between the incoming light source ray and the normal line of the sample at the intersection of the ray with the sample. Another way of defining the sample incident angle would be that it is half the angle between the incident and reflected rays at the intersection with the sample.

FIG. 2 illustrates one of the issues with changing and increasing the incident angle and increased sample size, or beam footprint, and the need to relocate the source and detector mirrors. An incident angle of 20° is the largest incident angle shown. At much larger incidence angles, the sample size requirement becomes significant and often unworkable. In addition, relocating and realigning the mirrors is a significant time commitment. Even at the 10° incident angle, the sample size required exceeds a standard 1" size dimension. Thus, the prior art reflectometer technique described with respect to FIG. 1A, FIG. 1B, and FIG. 2 suffers from drawbacks that are addressed by the illustrative embodiments, as described further below.

Figure 3:
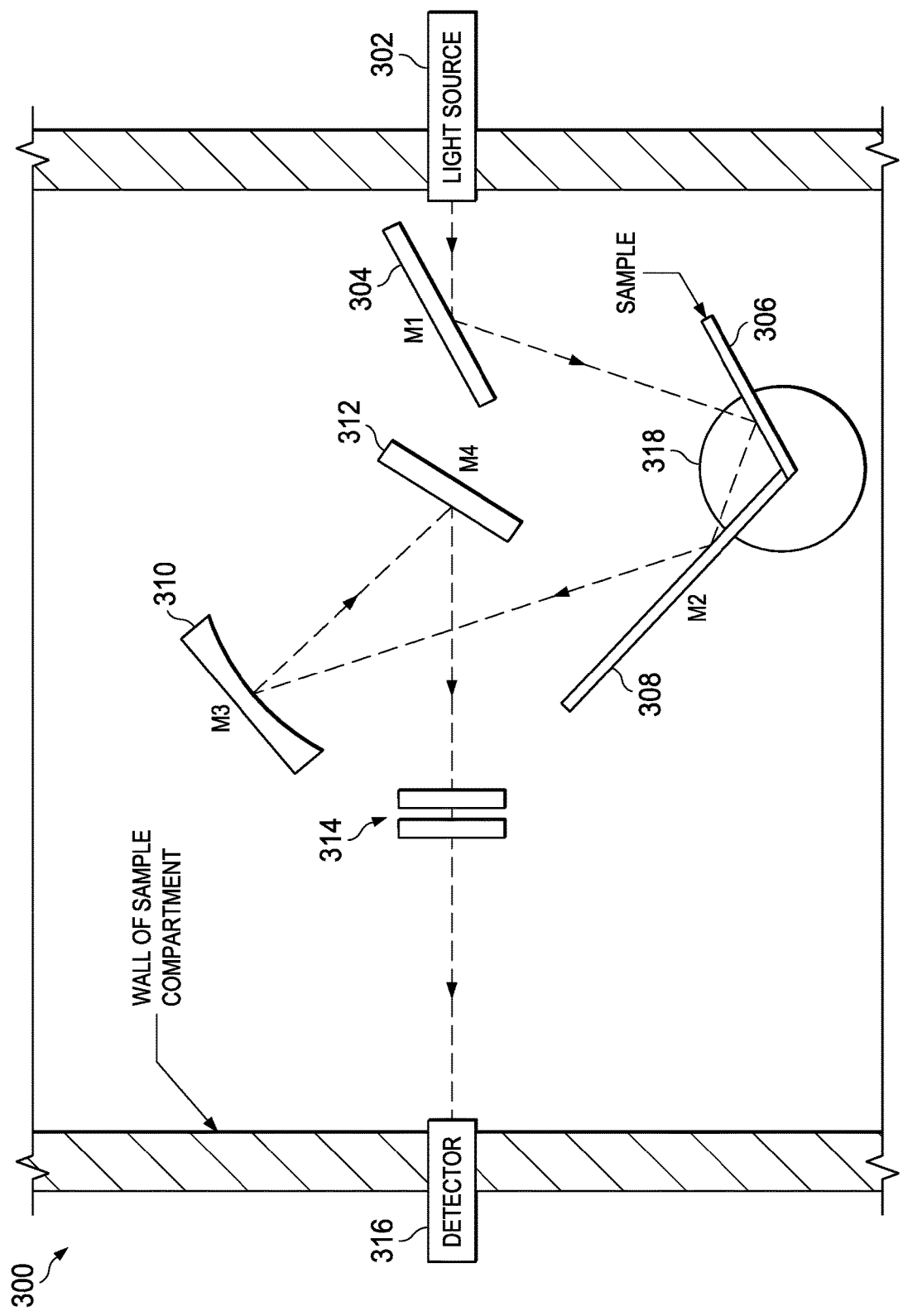
FIG. 3 illustrates a prior art method for a variable angle reflectance sample measurement, in accordance with an illustrative embodiment.

FIG. 3 illustrates a prior art method for a variable angle reflectance sample measurement, in accordance with an illustrative embodiment. Reflectometer system 300 includes light source 302, mirror M1 304, sample 306, mirror M2 308, mirror M3 310, mirror M4 312, polarizer pair 314, and detector 316. Sample 306 and mirror M2 308 can rotate with rotatable platform 318, which may include a mirror aperture. The arrows and lines in FIG. 3 represent the light path taken by the beam emitted by light source 302.

Harrick Scientific Corp makes a variable measurement system, shown in FIG. 3, that may be used to perform the variable angle measurement of specular reflection. In other words, FIG. 3 is an illustration of the Harrick Scientific Corp. variable angle reflectometer.

A sequence of scans similar to that used for the near-normal reflectance is carried out using this instrument to obtain a relative value. As with a near-normal case, the relative value is multiplied by the absolute reflectance of the reference standard at the same angle and polarization to obtain an absolute calibration. In order to obtain an absolute calibration of reference standard mirrors, the mirrors are calibrated at near-normal angle to give an absolute calibration.

However, this technique is not a direct absolute measurement; rather, it is a derived absolute versus angle of a reference standard based on an absolute value measured at a single angle (via a 'V-W' technique) and correlated to a variable measurement at the same angle. Through literature provided and fitted optical constants, reference values are provided at larger angles. To summarize, the variable angle measurements are based on a reference standard with hybrid reflectance derived from a single measured absolute angle and polarization projected to other angles and polarizations based on published and fitted optical constants.

A limitation to the variable angle technique shown in FIG. 3 is the need for a fairly limited sample size. Sample size is limited in maximum thickness as well as minimum and maximum height and width. For samples of fixed sizes outside of these ranges, a different instrument would have to be used.

Figure 4:
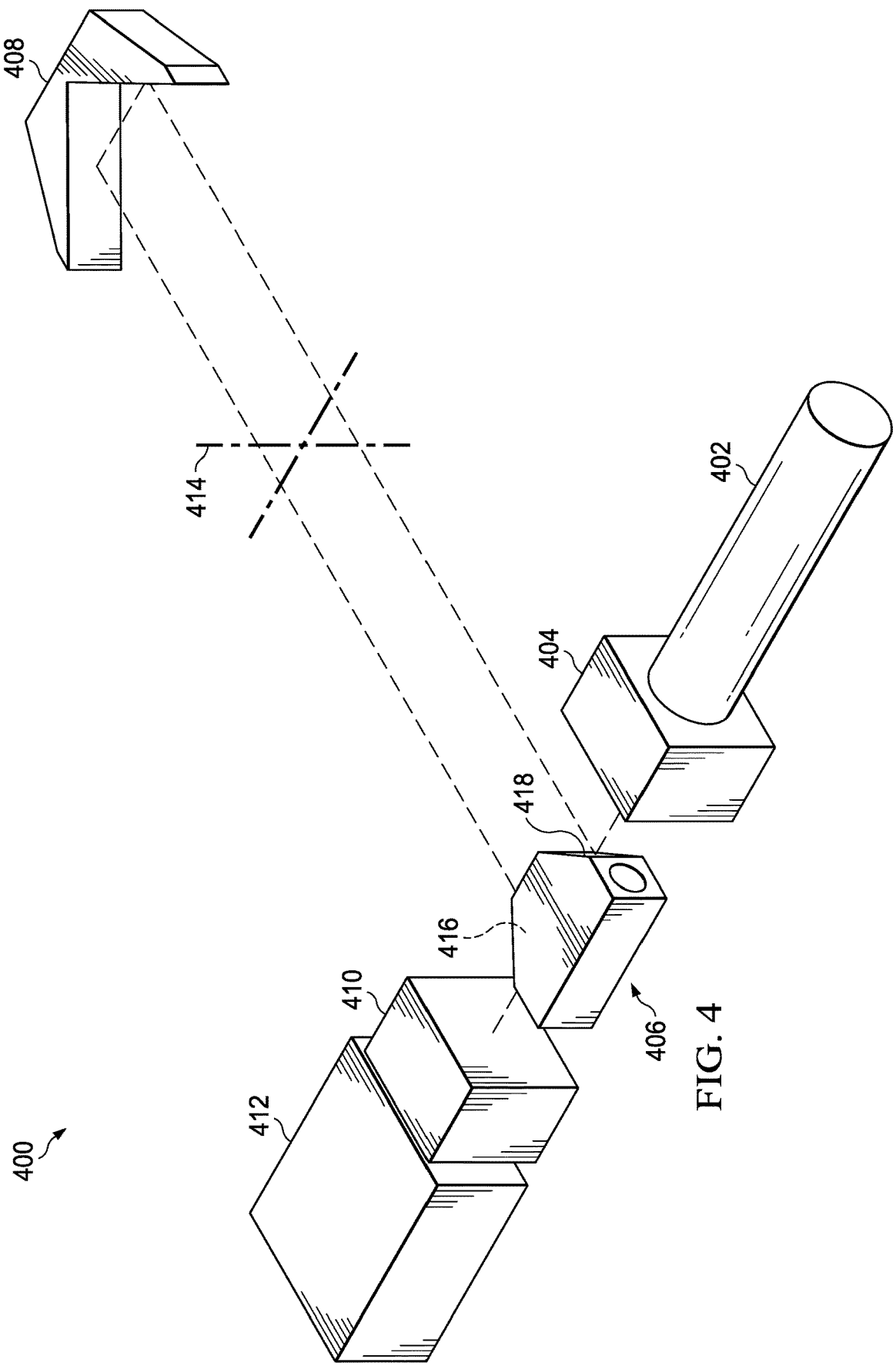
FIG. 4 illustrates a specular variable angle absolute reflectometer in a 100% reflectance measurement configuration, in accordance with an illustrative embodiment.

FIG. 4 illustrates a specular variable angle absolute reflectometer in a 100% reflectance measurement configuration, in accordance with an illustrative embodiment. FIG. 4 represents a substantial improvement over the prior art reflectometers shown in FIG. 1 through FIG. 3.

Specular variable angle absolute reflectance reflectometer 400 includes light source 402, optional polarizer 404, mirror system 406, roof mirror 408, optional polarizer 410, and detector 412. Another term for roof mirror 408 is "roof reflector." A sample is deliberately omitted from FIG. 4 because FIG. 4 illustrates a calibration or 100% reflectivity configuration. However, sample axis 414 is shown as dashed lines where the sample would be placed for later sample measurement. Again, sample axis 414 lies on the face of the sample, or the sample surface. The rest of the lines shown in FIG. 4 represent the light path.

Specular variable angle absolute reflectance reflectometer 400 has a number of advantages over the traditional 'V', 'W', and the "V-W" type of angular reflectometers shown in FIG. 1A, FIG. 1B, FIG. 2, and FIG. 3. Specular variable angle absolute reflectance reflectometer 400 provides two bounce absolute reflectance at variable angles and polarizations for samples with minimal size restrictions.

A useful feature of specular variable angle absolute reflectance reflectometer 400 is the implementation of roof mirror 408. As illustrated in FIG. 4, roof mirror 408 returns a beam in a plane parallel to the incident beam. In the shown configuration, the incident and return beam are both in a horizontal plane, as are the output of light source 402 and input of detector 412. For illustration purposes and as one suggested source, a wavelength tunable laser is shown with optional polarization control and a polarization analyzer via polarizer 404 and polarizer 410. However, both polarizers are optional.

Additionally, light source 402 need not be a wavelength tunable laser, but may be a fixed wavelength laser, a single line laser, a broadband source, a light emitting diode source, a filtered broadband source, a solar light simulator, actual solar light directed into the system, or any other appropriate light source for an intended measurement configuration.

There are a variety of configurations that can be used for source and detector steering. The configuration shown in FIG. 4 is proposed as the 100% measurement or system 100% value. This arrangement corresponds to the 'V' configuration measured value in the 'V-W' system shown in FIG. 1 or FIG. 2, though of course the prior art systems do not include roof mirror 408 or the arrangement of mirror system 406.

Mirror system 406 in FIG. 4 is shown as a single block or a single mirror having two faces, face 416 and face 418. Each face is mirrored in order to reflect the light beam from light source 402 as shown in FIG. 4. However, mirror system 406 may be different mirror systems, such as the two separate mirrors shown, for example, in FIG. 6 through FIG. 10. Additionally, mirror system 406 may have more than two mirrors, depending on the desired arrangement for a particular application.

Figure 5:
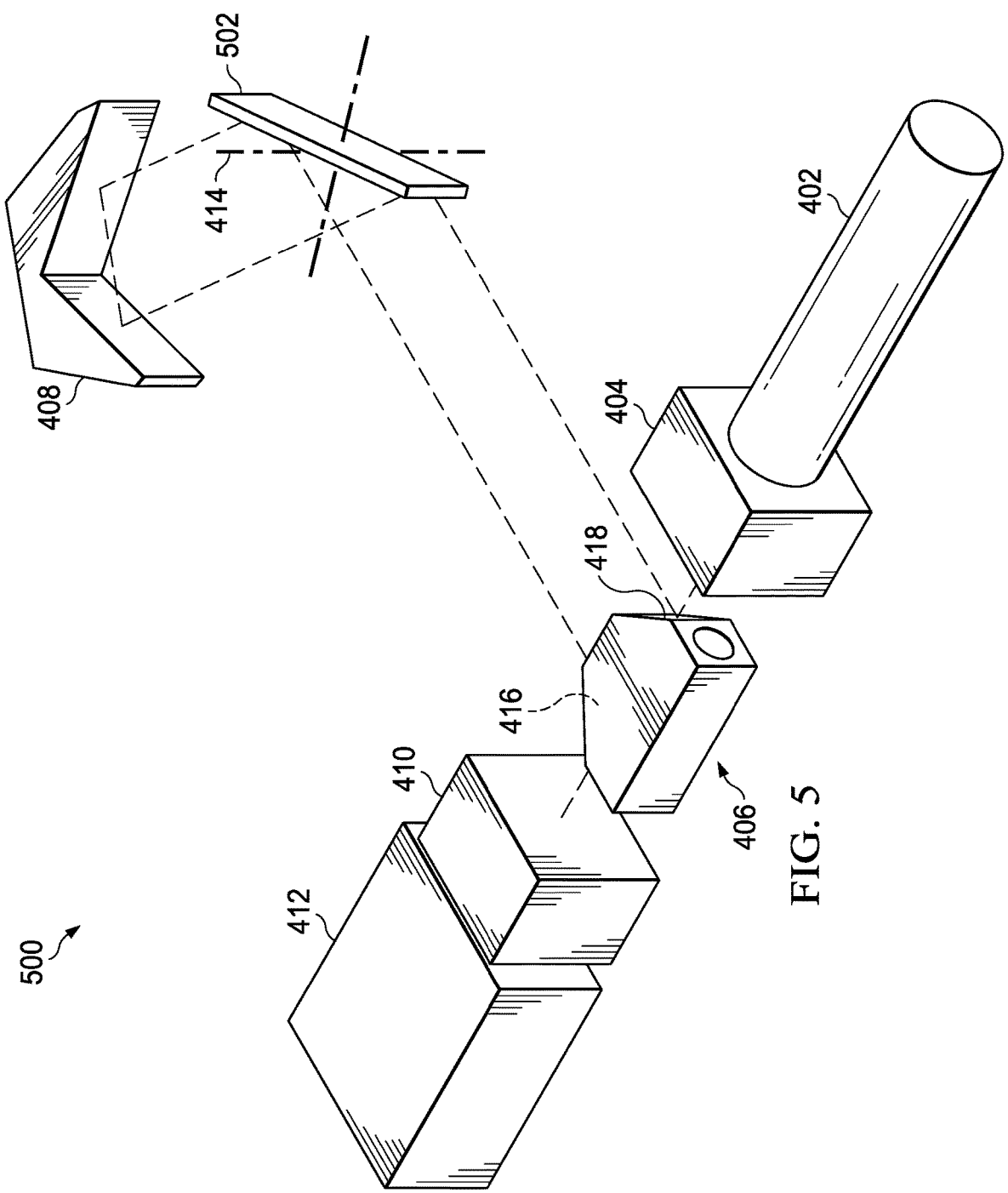
FIG. 5 illustrates a specular variable angle absolute reflectometer in a 60 degree configuration for sample reflectivity measurement, in accordance with an illustrative embodiment.

FIG. 5 illustrates a specular variable angle absolute reflectometer in a 60 degree configuration for sample reflectivity measurement, in accordance with an illustrative embodiment. Thus, specular variable angle absolute reflectometer 500 is a variation of specular variable angle absolute reflectometer 400 shown in FIG. 4. Specular variable angle absolute reflectometer 500 uses similar components as specular variable angle absolute reflectometer 400 of FIG. 4, and thus share common reference numerals. However, in this example, two differences are present: sample 502 has been added, and roof mirror 408 has been rotated about sample axis 414.

One useful arrangement of the illustrative embodiments is that the roof mirror is configured to be rotated about sample axis 414. This functionality may be implemented using a number of different devices, including but not limited to an electromechanical motor, a moveable mount holding roof mirror 408, a series of gears or knobs, or any convenient mechanical mechanism for rotating roof mirror 408 about sample axis 414. In the illustrative embodiment shown in FIG. 5, roof mirror is rotated through a 60 degree angle about sample axis 514 relative to a 0 degree reference which is the direction of the light path shown in FIG. 5.

Thus, once sample 502 is placed with the sample face at sample axis 414, with the sample face towards light source 402 and detector 412, sample 502 is rotated to the desired incident angle. In this case, sample 502 is rotated 60° counterclockwise from the light beam. In particular roof mirror 408 is rotated to intercept the reflected beam and redirect the reflected beam for a second reflection off of the sample, as shown in FIG. 5. The second reflection from sample 502 follows the same path as the reflected beam from roof mirror 408 in the calibration, or 100% configuration, shown in FIG. 4.

If one considers sample 502 facing light source 402 and detector 412 and the sample normally parallel to both the light source and detector as zero, the sample incident angle can be achieved by turning either clockwise or counterclockwise by the desired incident angle. If one considers the roof mirror angular position to be 180° when roof mirror 408 is in the calibration, or 100% configuration, as shown in FIG. 4, the roof mirror angle is zero when roof mirror 408 is positioned between the source beam and the detector beam nearest to detector 412 and light source 402.

Roof mirror 408 is rotated to twice the desired sample incident angle in the same direction as source 402 to intercept and return the reflected beam. Since these relative angular rates are fixed, a mechanical coupling between the two could be implemented or, for alignment versatility, rotational movements could be controlled independently.

Two other potential features could be provided to specular variable angle absolute reflectometer 500: a light trap and a chopper. The light trap may be placed in or near mirror system 406 that would intercept the source output with a forward movement of mirror system 406 and a direct path from the source to the detector when the mirror system 406 is retracted from intercepting the source beam. This feature could be implemented by providing mirror system 406 with the ability to translate forwards and backwards along the same axes taken by the light paths shown in FIG. 5 using a motor, a rail system, or other convenient mechanical mechanism. In addition, linear, (in-out) movement of mirror system 406 can provide a zero measurement, a source total power measurement, and a 100% level measurement (with sample removed and roof mirror 408 in the calibration or 100% configuration. The source total power is useful for compensating for any source drift over time.

A chopper could also be introduced at the source output, before or after optional polarizer 404. The copper may be used to extract the source and/or detector signal from the background noise caused by light leaks or light that scatters inside specular variable angle absolute reflectometer 500.

There are a number of potential optical layouts that can be implemented, all of which take advantage of roof mirror 408. The input and output, source and detector, all laying in a single plane (as shown in FIG. 5) illustrates one easily defined configuration, but forces a large sample size at high angles of incidence. While the input/output beam spacing can be reduced to minimize the input/output beam footprint on the sample, there are other configurations that can further reduce the footprint at high angles of incidence. These other configurations are described below.

Figure 6:
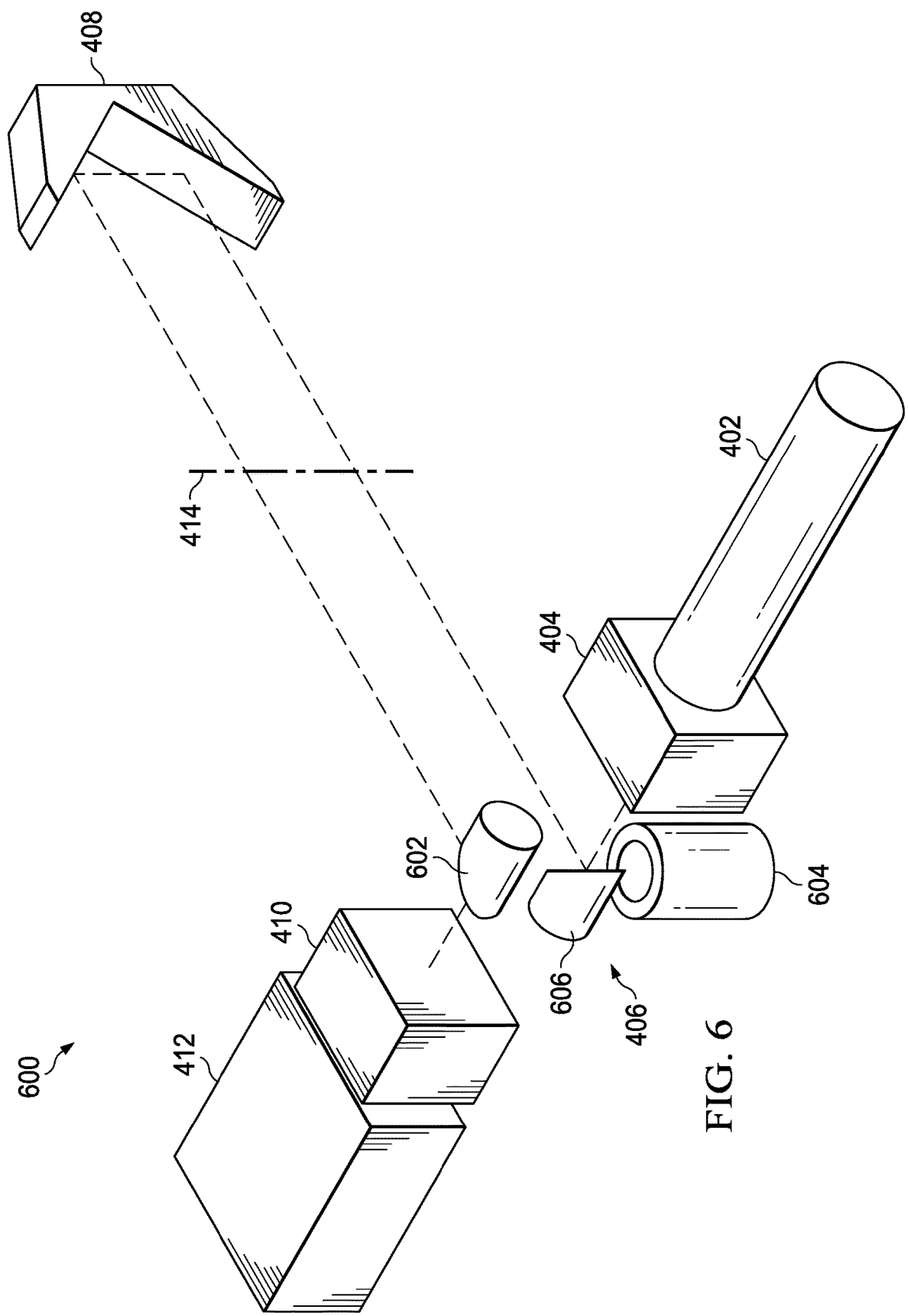
FIG. 6 illustrates a specular variable angle absolute reflectometer in a 100% reflectance measurement configuration, with a two-mirror system plus a light trap, in accordance with an illustrative embodiment.
Figure 7:
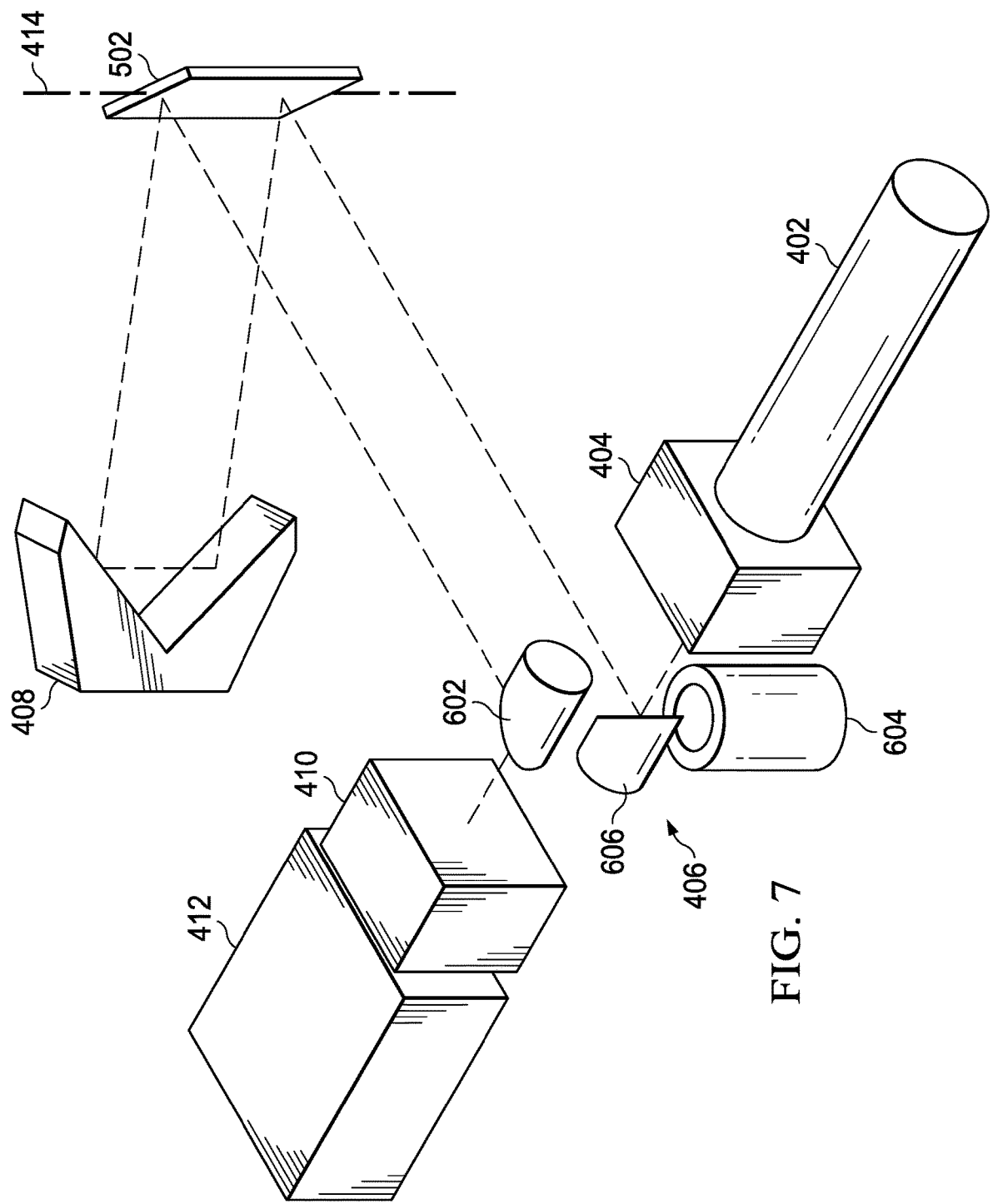
FIG. 7 illustrates a specular variable angle absolute reflectometer in a 30 degree sample reflectance measurement configuration, with a two-mirror system plus a light trap, in accordance with an illustrative embodiment.
Figure 8:
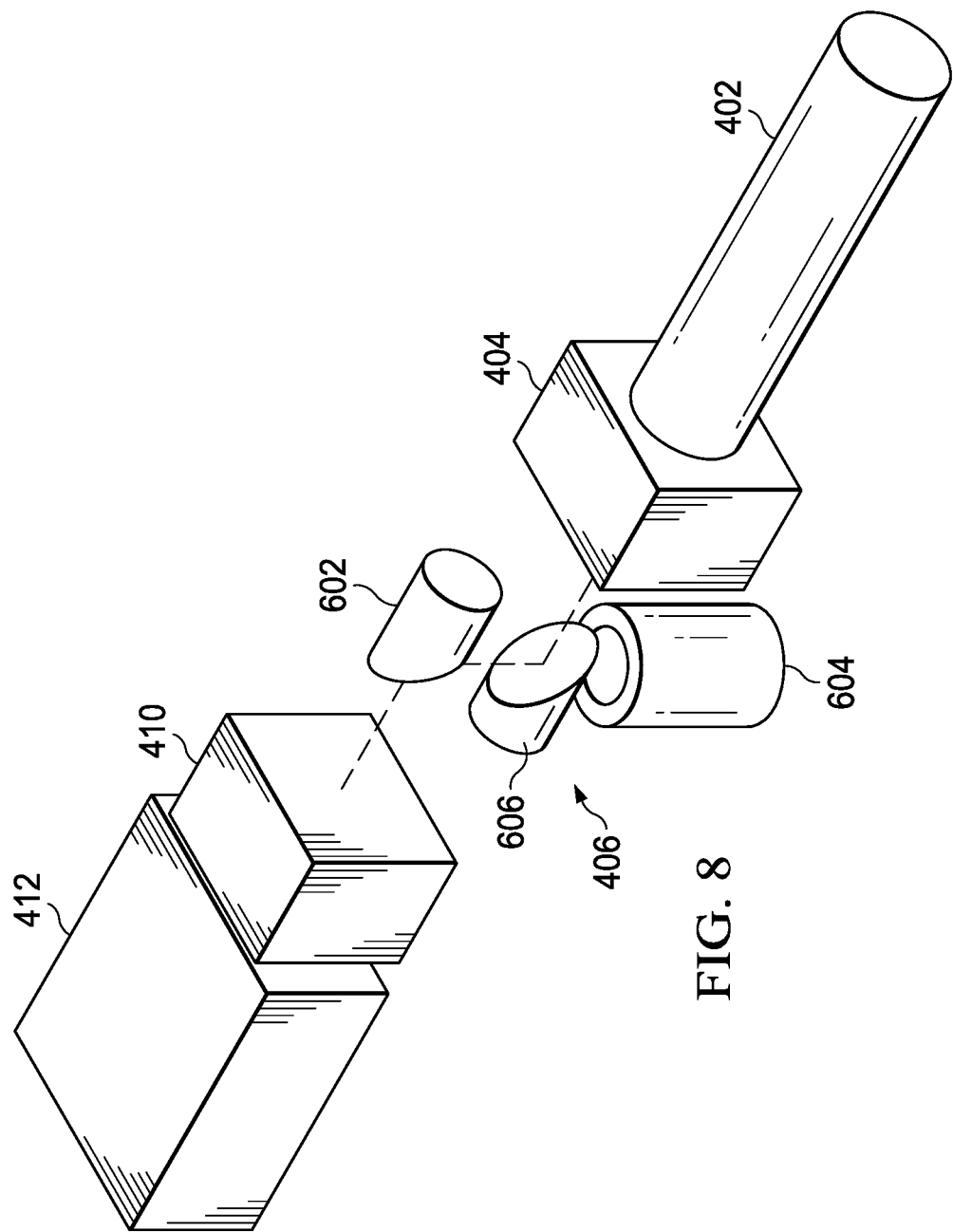
FIG. 8 illustrates a specular variable angle absolute reflectometer in a configuration to measure a light source drift and a total power for a vertical roof mirror configuration, in accordance with an illustrative embodiment.

FIG. 6 through FIG. 8 should be read together. FIG. 6 illustrates a specular variable angle absolute reflectometer in a 100% reflectance measurement configuration, with a two-mirror system plus a light trap, in accordance with an illustrative embodiment. FIG. 7 illustrates a specular variable angle absolute reflectometer in a 30 degree sample reflectance measurement configuration, with a two-mirror system plus a light trap, in accordance with an illustrative embodiment. FIG. 8 illustrates a specular variable angle absolute reflectometer in a configuration to measure a light source drift and a total power for a vertical roof mirror configuration, in accordance with an illustrative embodiment. Because these figures use similar components as those described in FIG. 4 and FIG. 5, similar components in FIG. 6 through FIG. 8 use similar reference numerals.

FIG. 6 shows an alternative configuration where roof mirror 408 is rotated 90° which puts the input and output beams in a vertical plane. Since sample axis 414 is vertical, the spacing between the two beams does not change. Only the footprint of the beam itself changes with angle. The size of the beam footprint is the beam diameter divided by the cosine of the incident angle.

Keeping the beam small minimizes the sample size requirement. As with the previous layout, the beam spacing can be reduced but may have practical limitations driven by the input output mirrors. Since the source and detector optical paths are on different levels but the same vertical plane, the laser power configuration can still be performed by rotating mirror system 406 about the source and detector beam axis as shown in FIG. 7. Of note is that mirror system 406 is counter rotating and can be mechanically coupled to minimize control requirements or controlled independently if desired. The source zero level, provided by the optional use of light trap 604 can be accomplished by rotating mirror system 406 180° from the position shown in FIG. 8.

While the Vertical Roof mirror optical layout in FIG. 6 significantly reduces the measurement footprint, the first and second sample reflections are on different areas of sample 502. A slight modification to the roof mirror, reducing the included angle by a small amount, can allow both the first and second bounces to fall on essentially the same location.

Another difference between the arrangements shown in FIG. 6 through FIG. 8 relative to the arrangements shown in FIG. 4 and FIG. 5 is that mirror system 406 is two separate mirrors in FIG. 6 through FIG. 8. Thus, mirror system 406 may be mirror 602 and mirror 606, which may be mounted on a single mechanical translation device (motor and mount or other device) or may be mounted on individual mechanical translation devices (motor and mount or other device).

Figure 9:
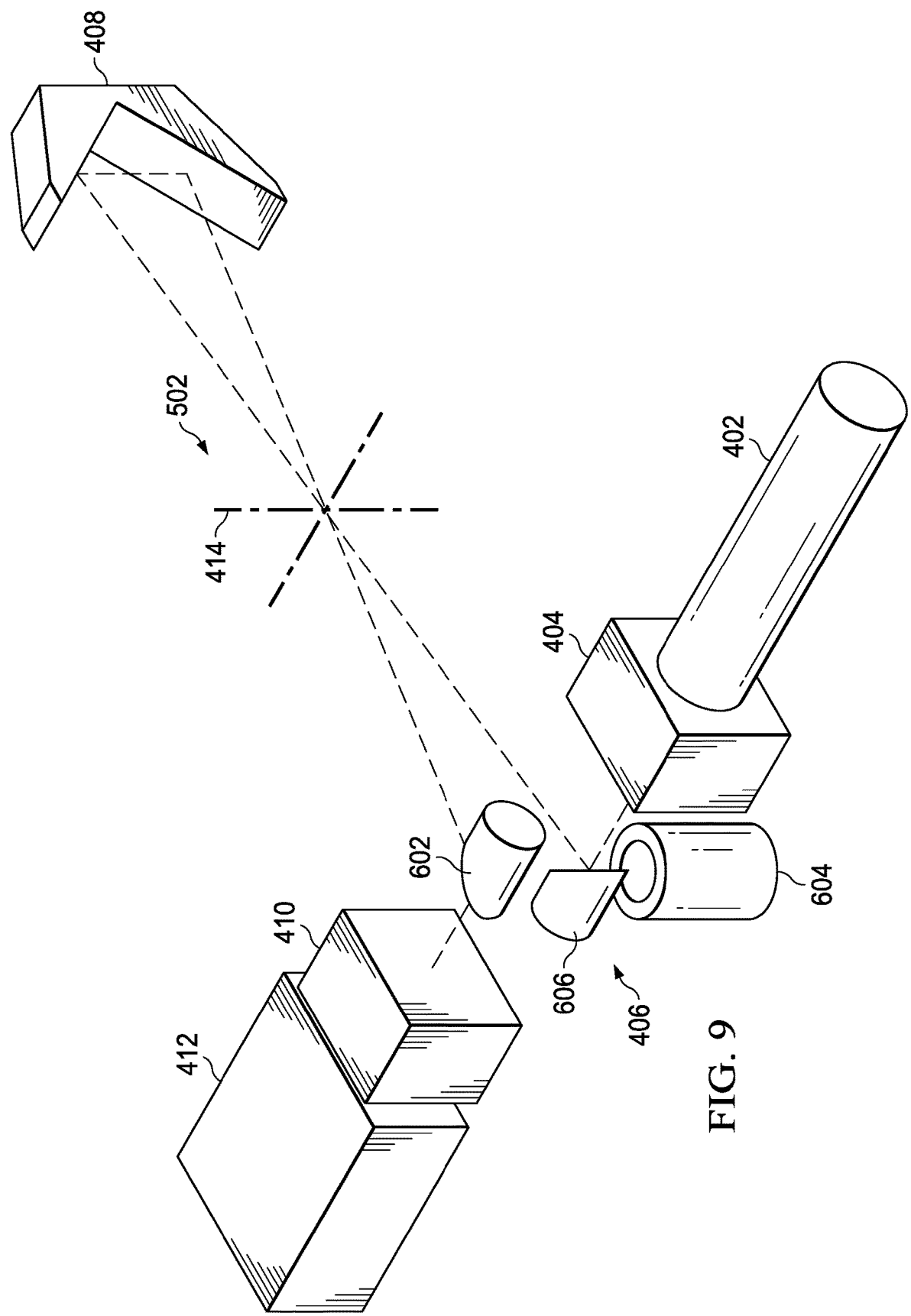
FIG. 9 illustrates a specular variable angle absolute reflectometer in a 100% reflectance measurement configuration, with coincident first and second bounces of the light beam, in accordance with an illustrative embodiment.
Figure 10:
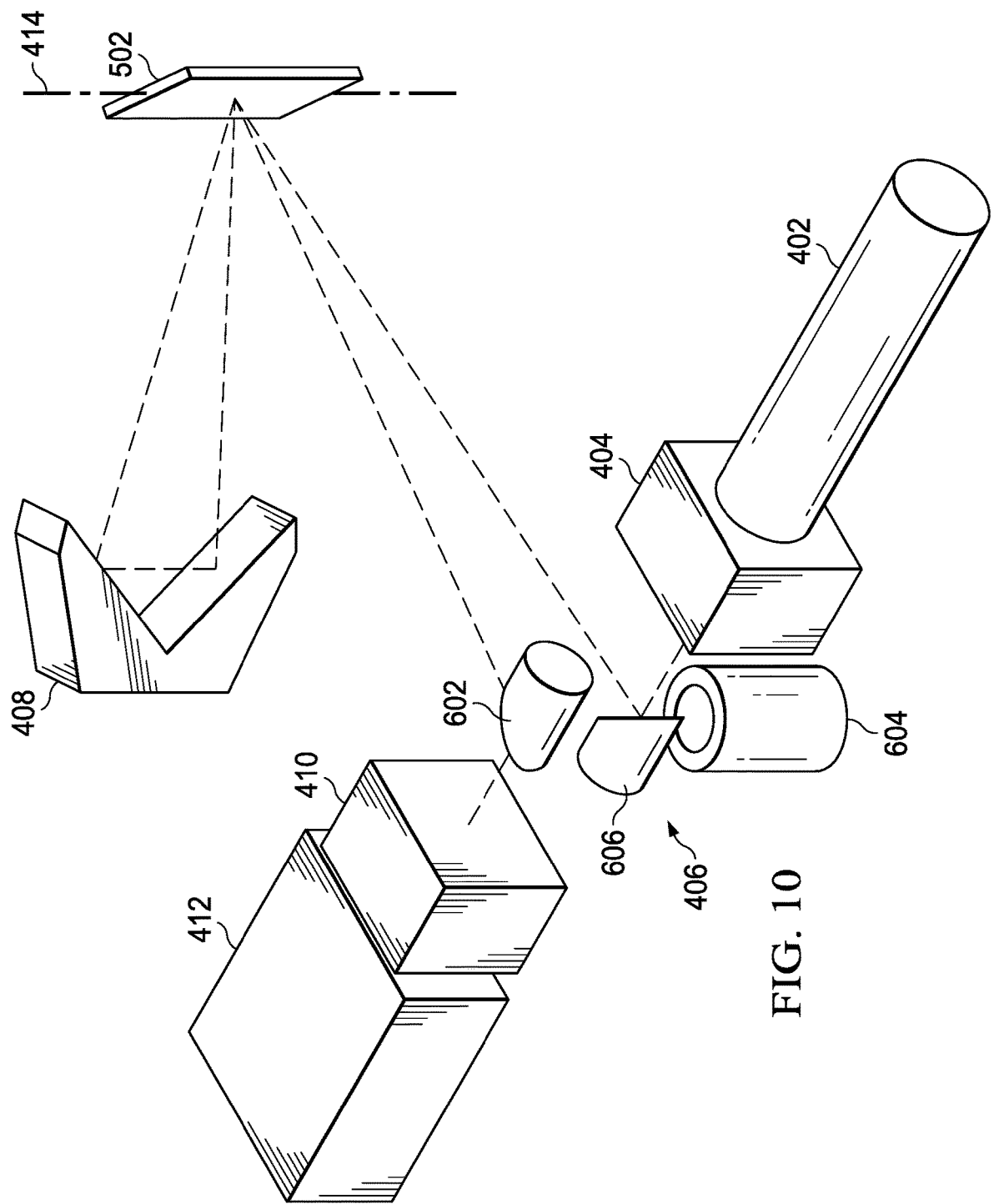
FIG. 10 illustrates a specular variable angle absolute reflectometer in a 30 degree sample reflectance measurement configuration, with a two-mirror system plus a light trap and coincident first and second bounces of the light beam, in accordance with an illustrative embodiment.

FIG. 9 and FIG. 10 should be read together. FIG. 9 illustrates a specular variable angle absolute reflectometer in a 100% reflectance measurement configuration, with coincident first and second bounces of the light beam, in accordance with an illustrative embodiment. FIG. 10 illustrates a specular variable angle absolute reflectometer in a 30 degree sample reflectance measurement configuration, with a two-mirror system plus a light trap and coincident first and second bounces of the light beam, in accordance with an illustrative embodiment. Because these figures use similar components as those described in FIG. 4 through FIG. 8, similar components in FIG. 9 and FIG. 10 use similar reference numerals.

FIG. 9 and FIG. 10 illustrate a configuration allowing coincident first and second bounce measured areas. This configuration differs only slightly from the parallel input output beam case in FIG. 6 and FIG. 7. The only significant difference is the slightly reduced included angle of roof mirror 408. Mirror system 406 requires only slight rotation to align the beams that is would not require a permanent modification to the mechanism. In these illustrative embodiments, mirror system 406 is a two-mirror system, including mirror 602 and mirror 604.

A sample mount with a flat face or three-point ball locations can be fabricated to position the sample face at a plane containing rotation axis 414. Left, right, up, and down positioning of sample 502 is not critical so long as the largest incident laser spot is contained within sample 502. An automated method for removing the sample for 100% measurement may be desired. Kinematic base mounts are another alternative.

One method for removing the sample from the optical path for performing a 100% measurement may be as follows. If roof mirror 408 and sample 502 are coupled, roof mirror 408 will be at 180° in the 100% position, or calibration position, when the sample angle of incidence is 90°. This arrangement makes the sample face parallel to the source beam and return beam. Sample 502 would only have to be moved by about half the beam diameter to be clear of the beam. A fixed cam or other mechanical or electromechanical means could push the sample mount backward, relative to the sample face normal. This procedure would also include sample 502 being mounted on a linear translation stage parallel with the sample normal.

Figure 11:
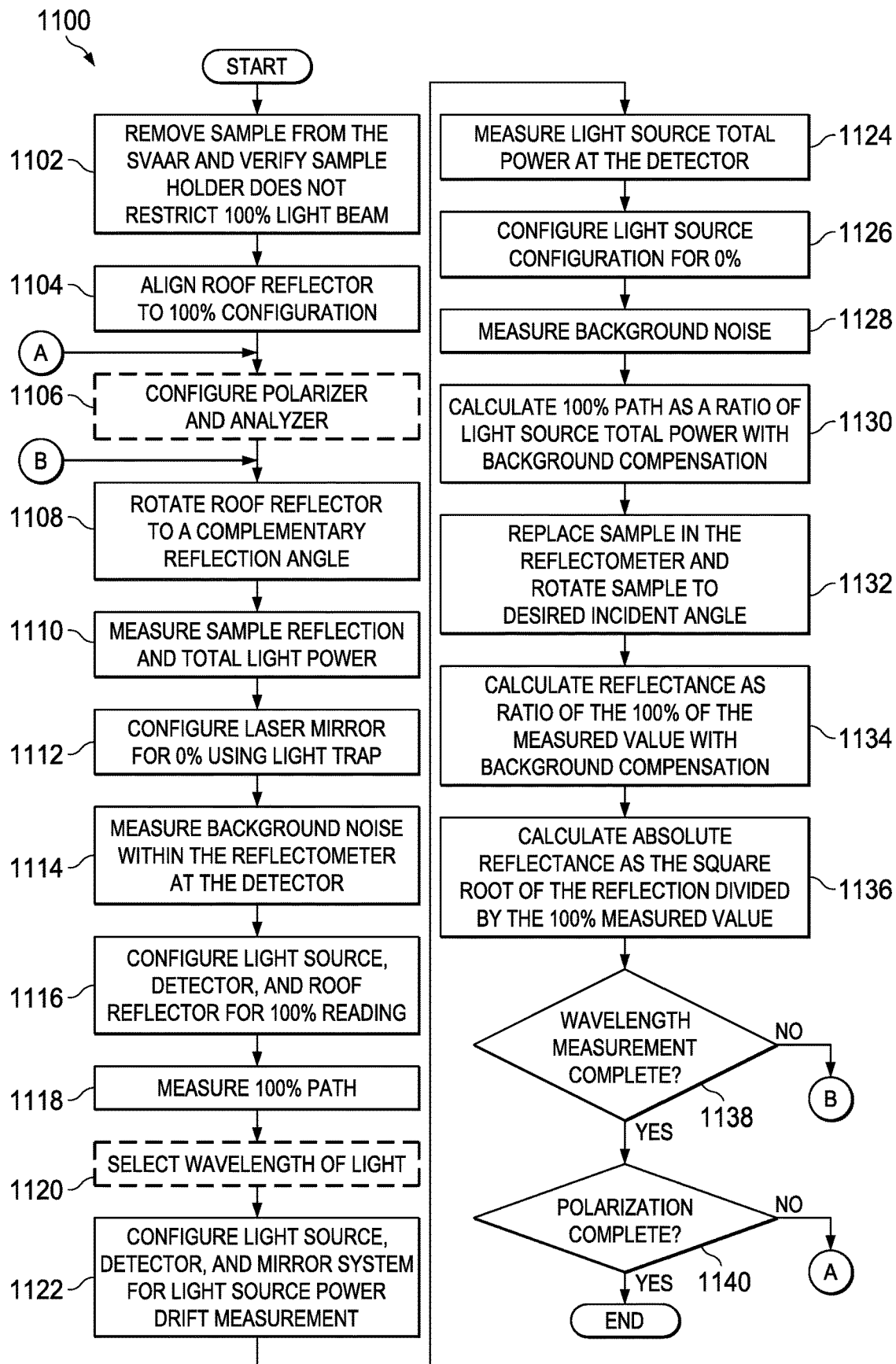
FIG. 11 illustrates a flowchart of a method for performing an absolute reflectance measurement of a sample using a specular variable angle absolute reflectometer, in accordance with an illustrative embodiment.

FIG. 11 illustrates a flowchart of a method for performing an absolute reflectance measurement of a sample using a specular variable angle absolute reflectometer, in accordance with an illustrative embodiment. Method 1100 may be a method executable using any of the specular variable angle absolute reflectometers shown in FIG. 4 through FIG. 10, and also that shown in FIG. 12, below. In other words, multiple looping orders may be used for the methods described herein to optimize measurement speed.

Method 1100 may begin by removing a sample from the SVAAR (specular variable angle absolute reflectometer) and verify the sample holder does not restrict a 100% light beam (operation 1102). The term "100% light beam" refers to the light beam path taken in the reflectometer when the sample is not present.

Method 1100 also includes aligning roof reflector to the 100% configuration (operation 1104). The term "100% configuration" means that the sample is not present in the reflectometer, so that the maximum possible light from the light source will reach the detector via the other components in the reflectometer.

Optionally, method 1100 also includes configuring a polarizer and analyzer (operation 1106). This operation is considered optional because the polarizer and/or the analyzer may not be present in some implementations.

Method 1100 also includes rotating the roof reflector to a complementary reflection angle (operation 1108). The term "complementary reflection angle" refers to an angle which is complementary of to the angle at which the sample will be placed with respect to a sample axis once the sample is replaced into the reflectometer.

Method 1100 also includes measuring sample reflector and total light power (operation 1110). Again, this operation takes place while the reflectometer is in the 100% configuration, such that the maximum possible light and light power reaches the detector.

Method 1100 also includes configuring the laser mirror for 0% using the light trap (operation 1112). The light trap absorbs all of the light from the light source. The purpose of this operation is in the next operation. Specifically, method 1100 also includes measuring the background noise within the reflectometer at the detector (operation 1114).

Method 1100 also includes configuring the light source, detector, and roof reflector for a 100% reading (operation 1116). The term "100% reading" means making a measurement of light received at the detector while the reflectometer is in the 100% configuration. The light source may be any number of light sources such as a laser (either fixed wavelength or tunable wavelength), a light emitting diode (LED), an ordinary light bulb, actual sunlight, a solar lam, or any other suitable light source for the intended application.

Method 1100 also includes measuring the 100% path (operation 1118). The term "measuring the 100% path" means measuring the path length the light beam will take within the reflectometer.

Method 1100 also includes, optionally, selecting a wavelength of light (operation 1120). This operation is considered optional because it only applies if the light source is tunable, such as with a tunable laser or with a tunable light emitting diode.

Method 1100 also includes configuring the light source, detector, and mirror system for light source power drift measurement (operation 1122). The purpose of this operation is to measure how the power measured at the detector varies over time, in order to compensate for this error when taking a sample measurement.

Method 1100 also includes measuring the light source total power at the detector (operation 1124). Method 1100 then includes configuring the light source for the 0% configuration (operation 1126). Again, method 1100 includes measuring background noise (operation 1128). At this point, method 1100 includes calculating 100% path as a ratio of light source total power with background compensation (operation 1130).

Method 1100 also includes replacing the sample in the reflectometer and rotating the sample to a desired incident angle (operation 1132). Method 1100 also includes calculating the reflectance as a ratio of the 100% measured value with background compensation (operation 1134). This operation means that the total reflectance measured at this operation is compared to the background compensation and the 100% measured value so that, as closely as possible, the actual reflectance of the sample can be determined. Specifically, method 1100 also includes calculating the absolute reflectance as the square root of the reflection divided by the 100% measured value (operation 1136).

Method 1100 also includes determining whether the wavelength measurement is complete (operation 1138). If not, then method 1100 returns to operation 1108. If so, or if operation 1120 was skipped, then the process continues. In particular, method 1100 then includes determining whether the polarization is complete (operation 1140). If not, then method 1100 returns to operation 1106. If so, or if operation 1106 is skipped, then method 1100 terminates.

Method 1100 is only one example of the use of a reflectometer as described with respect to FIG. 4 through FIG. 10. Other examples are possible. Thus, method 1100 does not necessarily limit the claimed inventions.

Figure 12:
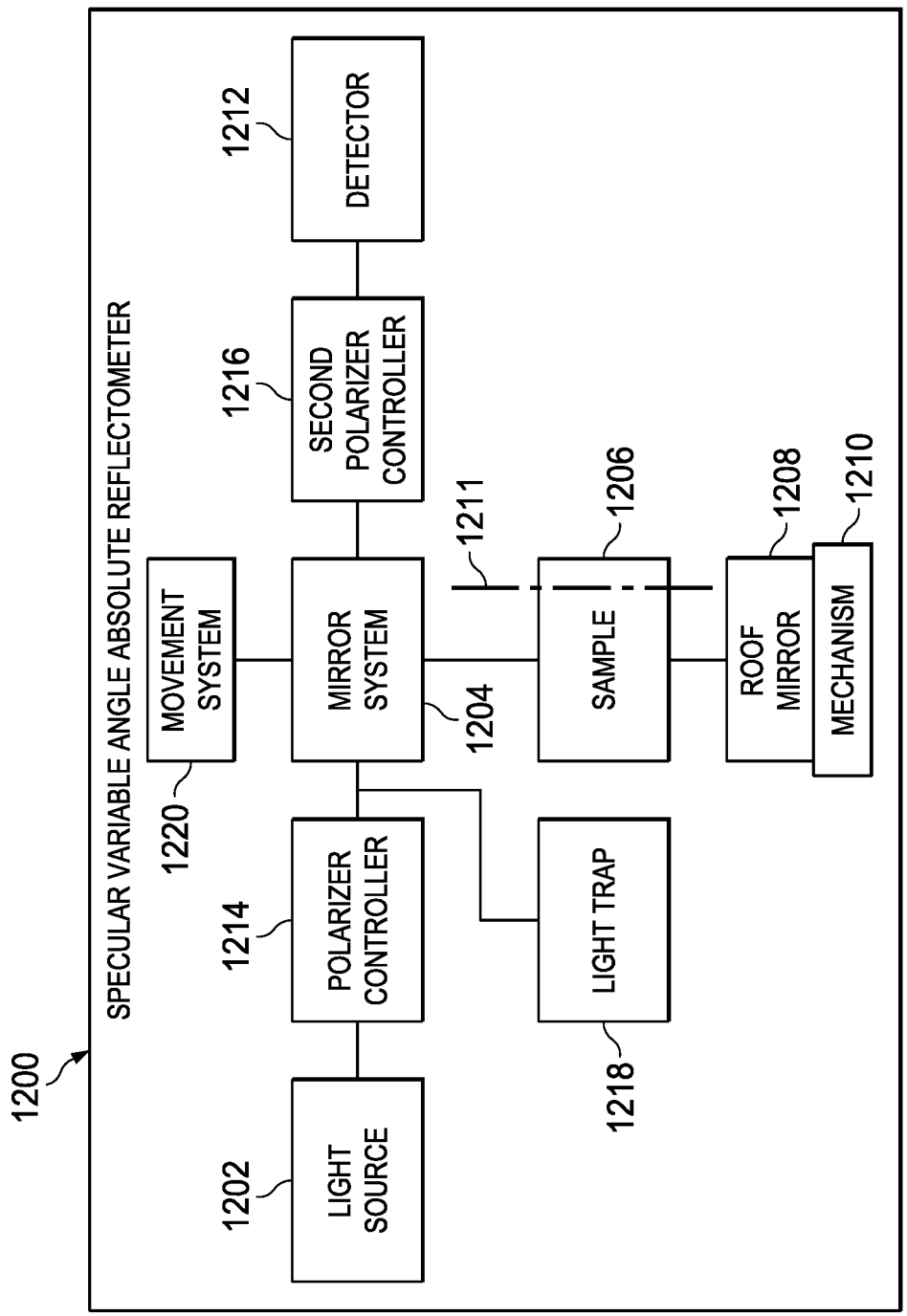
FIG. 12 illustrates a specular variable angle absolute reflectometer, in accordance with an illustrative embodiment.

FIG. 12 illustrates a specular variable angle absolute reflectometer, in accordance with an illustrative embodiment. Specular variable angle absolute reflectometer 1200 is a variation of those shown with respect to FIG. 4 through FIG. 10.

Specular variable angle absolute reflectometer 1200 includes light source 1202. Specular variable angle absolute reflectometer 1200 also includes mirror system 1204 in a light path of the light source. Mirror system 1204 may be configured to reflect a light beam from the light source 1202 towards sample 1206 that is optically reflective.

Specular variable angle absolute reflectometer 1200 also includes roof mirror 1208 disposed in the light path after sample 1206. Roof mirror 1208 is configured to reflect the light beam back towards sample 1206.

Specular variable angle absolute reflectometer 1200 also includes mechanism 1210 connected to roof mirror 1208. Mechanism 1210 may be configured to rotate roof mirror 1208 about a sample axis 1211 of sample 1206. Mechanism 1210 may be a motor, mount, micro-electromechanical device, set of gears, knobs, or any other suitable means for translating and/or rotating roof mirror 1208.

Specular variable angle absolute reflectometer 1200 also includes detector 1212 in the light path after roof mirror 1208 such that detector 1212 receives light that has been reflected from roof mirror 1208, thence back to sample 1206, thence back to the mirror system 1204, and thence to detector 1212.

Specular variable angle absolute reflectometer 1200 may be varied. For example, roof mirror 1208 may be a "V" shaped wedge with an inner angle of the "V" shaped wedge facing sample 1206.

In another example, the light source may be a tunable laser. However, the light source may be any suitable light source for different applications, including but not limited to fixed wavelength lasers, light emitting diodes (LEDs), solar lamps, light bulbs, natural sunlight, or other light sources appropriate for a specific application.

In another example, specular variable angle absolute reflectometer 1200 may also include polarization controller 1214 disposed in the light path between light source 1202 and mirror system 1204. In a related, but different, example, specular variable angle absolute reflectometer 1200 may additionally include second polarization controller 1216 disposed in the light path between mirror system 1204 and the detector 1212.

Second polarization controller 1216 may be generally referred to as a polarization 'analyzer' and is used to determine the rotation or change of the light polarization by sample 1206. Often, for a given input polarization, second polarization controller 1216 is rotated between about 0 to 90 degrees relative to the polarization controller 1214. If sample 1206 has had no effect on the polarization of the light, the maximum signal on detector 1212 will occur when second polarization analyzer 1216 is parallel with polarization controller 1214, which corresponds to '0' degrees.

In a different illustrative embodiment, mirror system 1204 may be a single mirror having a first face on a first side of the single mirror and a second face on a second side of the single mirror. In this case, the first face is configured to reflect light from light source 1202 to sample 1206, and the second face is configured to reflect light from sample 1206 towards detector 1212.

In yet another illustrative embodiment, mirror system 1204 may be a first mirror and a second mirror. In this case, the first mirror is configured to reflect light from light source 1202 to sample 1206, and the second mirror is configured to reflect light from sample 1206 towards detector 1212.

In still another illustrative embodiment, specular variable angle absolute reflectometer 1200 may include light trap 1218 associated with the mirror system. The term "associated with" in this context means that the light trap is disposed in the light path such that light trap 1218 can intercept light from light source 1202 when a position of mirror system 1204 is adjusted or when a position of light trap 1218 is adjusted. For example, light trap 1218 is configured to intercept the light from light source 1202 with a forward movement of mirror system 1204, and a direct path from light source 1202 to detector 1212 when mirror system 1204 is retracted from intercepting the light. Specular variable angle absolute reflectometer 1200 may also include movement system 1220 connected to mirror system 1204 that is configured to move mirror system 1204.

In a different example, roof mirror 1208 is rotated at a first angle about sample axis 1211 that is about twice an angular distance through with sample 1206 is rotated about sample axis 1211. In yet another example, first and second reflections from sample 1206 are coincident.

Figure 13:
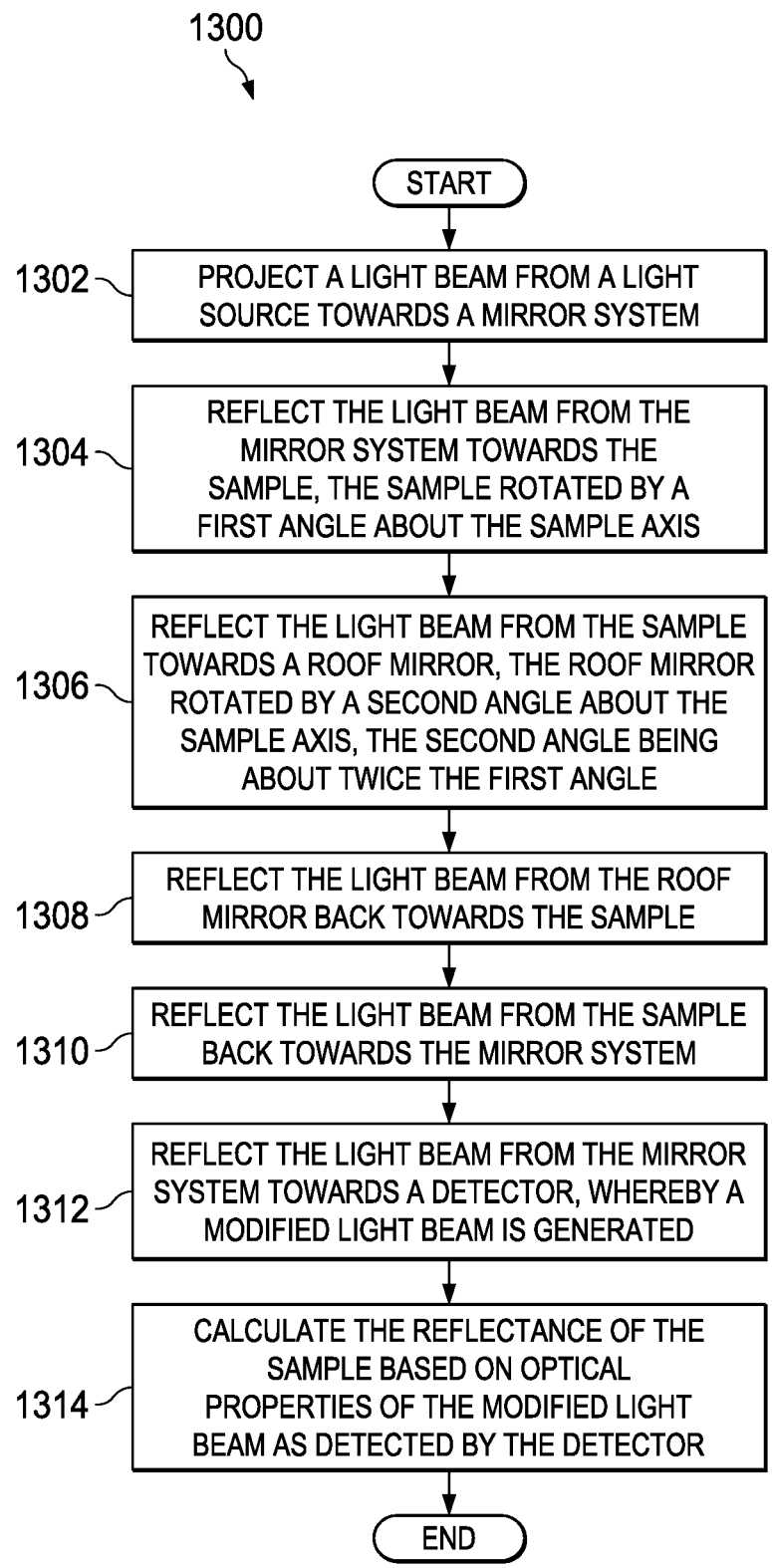
FIG. 13 illustrates a method of measuring a reflectance of a sample having a sample axis, in accordance with an illustrative embodiment.

FIG. 13 illustrates a method of measuring a reflectance of a sample having a sample axis, in accordance with an illustrative embodiment. Method 1300 is an alternative method to method 1100 of FIG. 11. Method 1300 may be implemented using any of the reflectometers shown in FIG. 4 through FIG. 10, as well as FIG. 12. Method 1300 may be characterized as a method of measuring a reflectance of a sample having a sample axis.

Method 1300 includes projecting a light beam from a light source towards a mirror system (operation 1302). Method 1300 also includes, thereafter, reflecting the light beam from the mirror system towards the sample, the sample rotated by a first angle about the sample axis (operation 1304).

Method 1300 also includes, thereafter, reflecting the light beam from the sample towards a roof mirror, the roof mirror rotated by a second angle about the sample axis, the second angle being about twice the first angle (operation 1306). Method 1300 also includes thereafter reflecting the light beam from the roof mirror back towards the sample (operation 1308).

Method 1300 also includes, thereafter, reflecting the light beam from the sample back towards the mirror system (operation 1310). Method 1300 also includes, thereafter, reflecting the light beam from the mirror system towards a detector, whereby a modified light beam is generated (operation 1312). Method 1300 also includes calculating the reflectance of the sample based on optical properties of the modified light beam as detected by the detector (operation 1314). In one illustrative embodiment, the method may terminate thereafter.

However, method 1300 may be further varies. For example, method 1300 may also include, prior to calculating, compensating for source drift and background-introduced errors by sequentially measuring the sample, a power of the light source, and a background error. In another example, method 1300 may also include limiting a measured foot print a diameter of the light beam divided a cosine of an incident angle of the light beam on the sample.

In yet another example, method 1300 may also include focusing the light beam at the detector to maximize signal and minimize alignment criticality. In still another example, method 1300 may also include, prior to projecting, determining a 100% reflectance level of the roof mirror by measuring a reflectance of the roof mirror using the light source, mirror system, and detector but without the sample. In this case, calculating the reflectance may be calculating an absolute reflectance of the sample. Additionally, in calculating the reflectance, a ratio of the reflectance of the sample to the 100% reflectance is an absolute measure of a square of the reflectance of the sample.

Still other variations are possible. For example, in another variation, method 1300 may also include intercepting the source output with a light trap when the mirror system is retracted from intercepting the source beam. In still another variation, method 1300 may also include extracting a source signal from a background by using a chopper disposed at an output of the light source.

Still other variations are possible. Thus, the examples provided with respect to FIG. 13 do not necessarily limit the claimed inventions.

Figure 14:
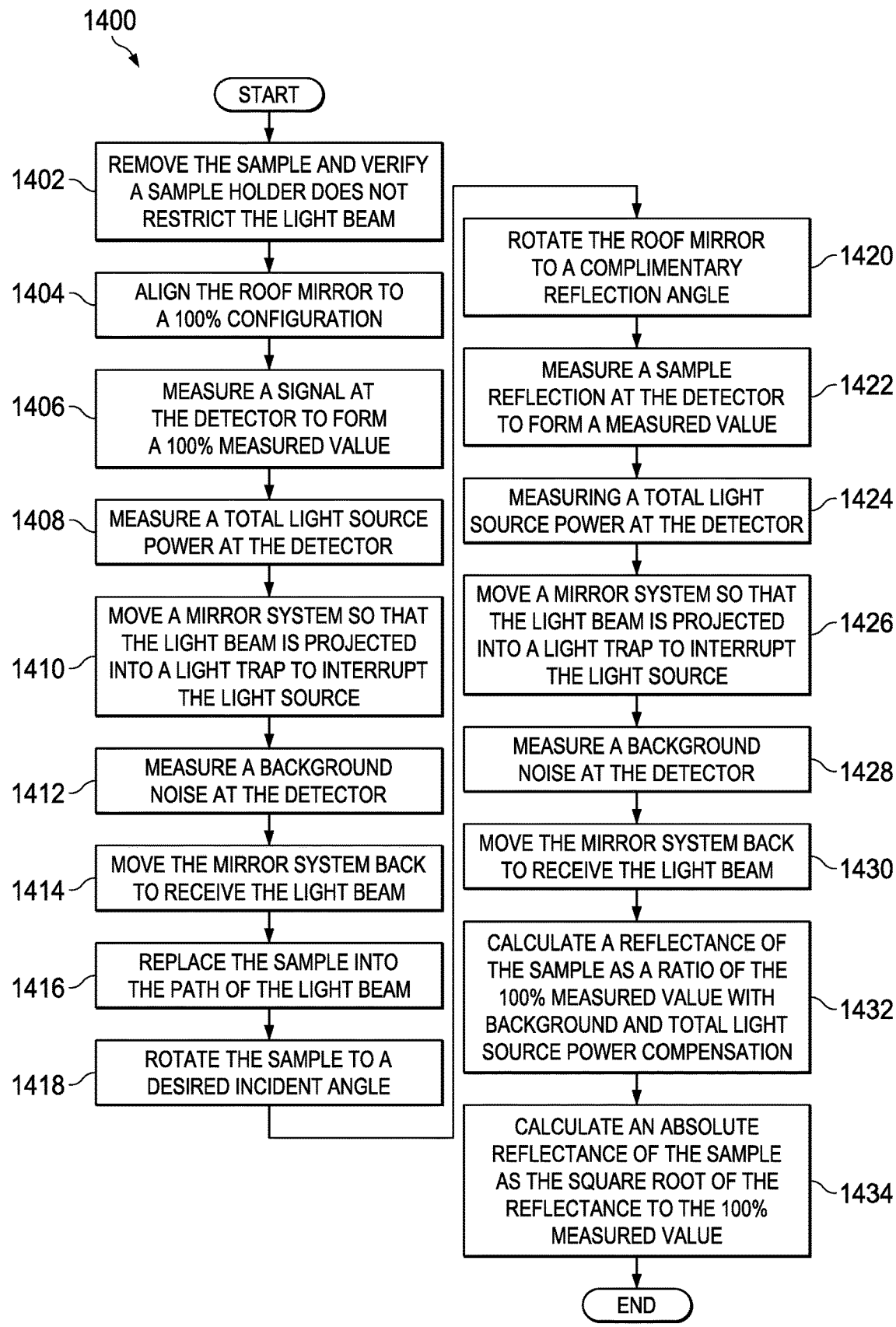
FIG. 14 illustrates a flowchart of a method of using a specular variable angle absolute reflectometer, in accordance with an illustrative embodiment.

FIG. 14 illustrates a method of using a specular variable angle absolute reflectometer, in accordance with an illustrative embodiment. Method 1400 is another variation of method 1100 of FIG. 11 or method 1300 of FIG. 13. Method 1400 may be implemented by any of the reflectometers described herein, including those shown in FIG. 4 through FIG. 10, as well as FIG. 12. Method 1400 may be characterized as a method of using a specular variable angle absolute reflectometer comprising a light source; a mirror system in a light path of the light source, the mirror system configured to reflect a light beam from the light source towards a sample that is optically reflective; a roof mirror disposed in the light path after the sample, the roof mirror configured to reflect the light beam back towards the sample; a mechanism connected to the roof mirror, the mechanism being configured to rotate the roof mirror about an axis of the sample; and a detector in the light path after the roof mirror such that the detector receives light that has been reflected from the roof mirror, thence back to the sample, thence back to the mirror system, and thence to the detector.

Method 1400 includes removing the sample and verify a sample holder does not restrict the light beam (operation 1402). Method 1400 also includes aligning the roof mirror to a 100% configuration (operation 1404).

Method 1400 also includes measuring a signal at the detector to form a 100% measured value (operation 1406). Method 1400 also includes measuring a total light source power at the detector (operation 1408).

Method 1400 also includes, thereafter, moving a mirror system so that the light beam is projected into a light trap to interrupt the light source (operation 1410). Method 1400 also includes, thereafter, measuring a background noise at the detector (operation 1412).

Method 1400 also includes, thereafter, moving the mirror system back to receive the light beam (operation 1414). Method 1400 also includes replacing the sample into the path of the light beam (operation 1416).

Method 1400 also includes rotating the sample to a desired incident angle (operation 1418). Method 1400 also includes rotating the roof mirror to a complimentary reflection angle (operation 1420).

Method 1400 also includes measuring a sample reflection at the detector to form a measured value (operation 1422). Method 1400 also includes measuring a total light source power at the detector (operation 1424).

Method 1400 also includes, thereafter, moving a mirror system so that the light beam is projected into a light trap to interrupt the light source (operation 1426). Method 1400 also includes, thereafter, measuring a background noise at the detector (operation 1428).

Method 1400 also include, thereafter, moving the mirror system back to receive the light beam (operation 1430). Method 1400 also includes calculating a reflectance of the sample as a ratio of the 100% measured value with background and total light source power compensation (operation 1432).

Method 1400 also includes calculating an absolute reflectance of the sample as the square root of the reflectance to the 100% measured value (operation 1434). In one illustrative embodiment, the method may terminate thereafter.

Figure 15:
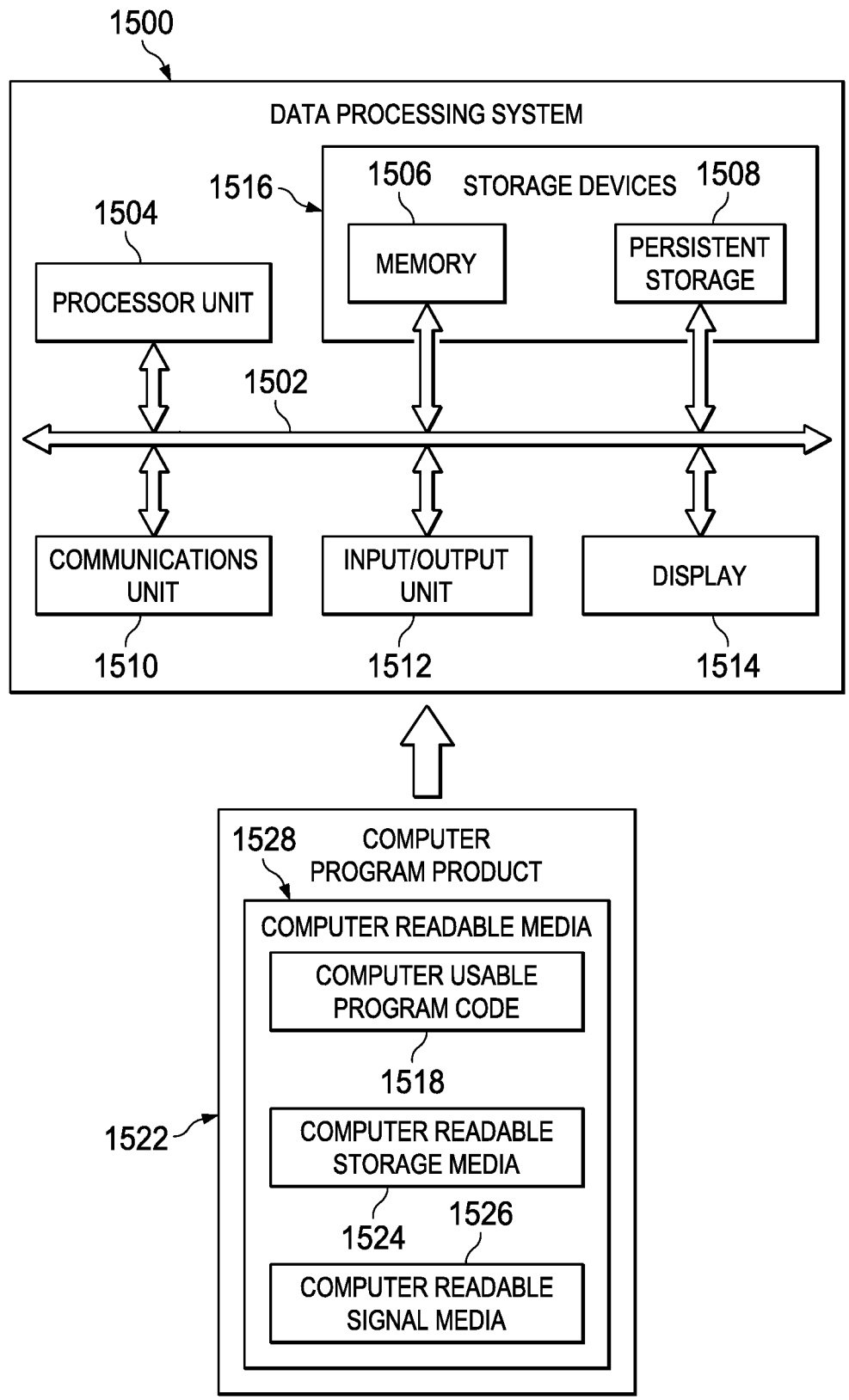
FIG. 15 illustrates a data processing system, in accordance with an illustrative embodiment.

Turning now to FIG. 15, an illustration of a data processing system is depicted in accordance with an illustrative embodiment. Data processing system 1500 in FIG. 15 is an example of a data processing system that may be used to implement data processing of detected light signals described in the above illustrative embodiments. In this illustrative example, data processing system 1500 includes communications fabric 1502, which provides communications between processor unit 1504, memory 1506, persistent storage 1508, communications unit 1510, input/output (I/O) unit 1512, and display 1514.

Processor unit 1504 serves to execute instructions for software that may be loaded into memory 1506. This software may be an associative memory, content addressable memory, or software for implementing the processes described elsewhere herein. Thus, for example, software loaded into memory 1506 may be software for executing method 1100 of FIG. 11, method 1300 of FIG. 13, or method 1400 of FIG. 14. Processor unit 1504 may be a number of processors, a multi-processor core, or some other type of processor, depending on the particular implementation. A number, as used herein with reference to an item, means one or more items. Further, processor unit 1504 may be implemented using a number of heterogeneous processor systems in which a main processor is present with secondary processors on a single chip. As another illustrative example, processor unit 1504 may be a symmetric multi-processor system containing multiple processors of the same type.

Memory 1506 and persistent storage 1508 are examples of storage devices 1516. A storage device is any piece of hardware that is capable of storing information, such as, for example, without limitation, data, program code in functional form, and/or other suitable information either on a temporary basis and/or a permanent basis. Storage devices 1516 may also be referred to as computer readable storage devices in these examples. Memory 1506, in these examples, may be, for example, a random-access memory or any other suitable volatile or non-volatile storage device. Persistent storage 1508 may take various forms, depending on the particular implementation.

For example, persistent storage 1508 may contain one or more components or devices. For example, persistent storage 1508 may be a hard drive, a flash memory, a rewritable optical disk, a rewritable magnetic tape, or some combination of the above. The media used by persistent storage 1508 also may be removable. For example, a removable hard drive may be used for persistent storage 1508.

Communications unit 1510, in these examples, provides for communications with other data processing systems or devices. In these examples, communications unit 1510 is a network interface card. Communications unit 1510 may provide communications through the use of either or both physical and wireless communications links.

Input/output (I/O) unit 1512 allows for input and output of data with other devices that may be connected to data processing system 1500. For example, input/output (I/O) unit 1512 may provide a connection for user input through a keyboard, a mouse, and/or some other suitable input device. Further, input/output (I/O) unit 1512 may send output to a printer. Display 1514 provides a mechanism to display information to a user.

Instructions for the operating system, applications, and/or programs may be located in storage devices 1516, which are in communication with processor unit 1504 through communications fabric 1502. In these illustrative examples, the instructions are in a functional form on persistent storage 1508. These instructions may be loaded into memory 1506 for execution by processor unit 1504. The processes of the different embodiments may be performed by processor unit 1504 using computer implemented instructions, which may be located in a memory, such as memory 1506.

These instructions are referred to as program code, computer usable program code, or computer readable program code that may be read and executed by a processor in processor unit 1504. The program code in the different embodiments may be embodied on different physical or computer readable storage media, such as memory 1506 or persistent storage 1508.

Program code 1518 is located in a functional form on computer readable media 1520 that is selectively removable and may be loaded onto or transferred to data processing system 1500 for execution by processor unit 1504. Program code 1518 and computer readable media 1520 form computer program product 1522 in these examples. In one example, computer readable media 1520 may be computer readable storage media 1524 or computer readable signal media 1526. Computer readable storage media 1524 may include, for example, an optical or magnetic disk that is inserted or placed into a drive or other device that is part of persistent storage 1508 for transfer onto a storage device, such as a hard drive, that is part of persistent storage 1508. Computer readable storage media 1524 also may take the form of a persistent storage, such as a hard drive, a thumb drive, or a flash memory, that is connected to data processing system 1500. In some instances, computer readable storage media 1524 may not be removable from data processing system 1500.

Alternatively, program code 1518 may be transferred to data processing system 1500 using computer readable signal media 1526. Computer readable signal media 1526 may be, for example, a propagated data signal containing program code 1518. For example, computer readable signal media 1526 may be an electromagnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in the illustrative examples.

In some illustrative embodiments, program code 1518 may be downloaded over a network to persistent storage 1508 from another device or data processing system through computer readable signal media 1526 for use within data processing system 1500. For instance, program code stored in a computer readable storage medium in a server data processing system may be downloaded over a network from the server to data processing system 1500. The data processing system providing program code 1518 may be a server computer, a client computer, or some other device capable of storing and transmitting program code 1518.

The different components illustrated for data processing system 1500 are not meant to provide architectural limitations to the manner in which different embodiments may be implemented. The different illustrative embodiments may be implemented in a data processing system including components in addition to or in place of those illustrated for data processing system 1500. Other components shown in FIG. 15 can be varied from the illustrative examples shown. The different embodiments may be implemented using any hardware device or system capable of running program code. As one example, the data processing system may include organic components integrated with inorganic components and/or may be comprised entirely of organic components excluding a human being. For example, a storage device may be comprised of an organic semiconductor.

In another illustrative example, processor unit 1504 may take the form of a hardware unit that has circuits that are manufactured or configured for a particular use. This type of hardware may perform operations without needing program code to be loaded into a memory from a storage device to be configured to perform the operations.

For example, when processor unit 1504 takes the form of a hardware unit, processor unit 1504 may be a circuit system, an application specific integrated circuit (ASIC), a programmable logic device, or some other suitable type of hardware configured to perform a number of operations. With a programmable logic device, the device is configured to perform the number of operations. The device may be reconfigured at a later time or may be permanently configured to perform the number of operations. Examples of programmable logic devices include, for example, a programmable logic array, programmable array logic, a field programmable logic array, a field programmable gate array, and other suitable hardware devices. With this type of implementation, program code 1518 may be omitted because the processes for the different embodiments are implemented in a hardware unit.

In still another illustrative example, processor unit 1504 may be implemented using a combination of processors found in computers and hardware units. Processor unit 1504 may have a number of hardware units and a number of processors that are configured to run program code 1518. With this depicted example, some of the processes may be implemented in the number of hardware units, while other processes may be implemented in the number of processors.

As another example, a storage device in data processing system 1500 is any hardware apparatus that may store data. Memory 1506, persistent storage 1508, and computer readable media 1520 are examples of storage devices in a tangible form.

In another example, a bus system may be used to implement communications fabric 1502 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 1506, or a cache, such as found in an interface and memory controller hub that may be present in communications fabric 1502.

Data processing system 1500 may also include associative memory 1528. Associative memory 1528 may be in communication with communications fabric 1502. Associative memory 1528 may also be in communication with, or in some illustrative embodiments, be considered part of storage devices 1516. While one associative memory 1528 is shown, additional associative memories may be present.

As used herein, the term "associative memory" refers to a plurality of data and a plurality of associations among the plurality of data. The plurality of data and the plurality of associations may be stored in a non-transitory computer readable storage medium. The plurality of data may be collected into associated groups. The associative memory may be configured to be queried based on at least indirect relationships among the plurality of data in addition to direct correlations among the plurality of data. Thus, an associative memory may be configured to be queried based solely on direct relationships, based solely on at least indirect relationships, as well as based on combinations of direct and at least indirect relationships. An associative memory may be a content addressable memory.

Thus, an associative memory may be characterized as a plurality of data and a plurality of associations among the plurality of data. The plurality of data may be collected into associated groups. Further, the associative memory may be configured to be queried based on at least one relationship, selected from a group that includes direct and at least indirect relationships, or from among the plurality of data in addition to direct correlations among the plurality of data. An associative memory may also take the form of software. Thus, an associative memory also may be considered a process by which information is collected into associated groups in the interest of gaining new insight based on relationships rather than direct correlation. An associative memory may also take the form of hardware, such as specialized processors or a field programmable gate array.

As used herein, the term "entity" refers to an object that has a distinct, separate existence, though such existence need not be a material existence. Thus, abstractions and legal constructs may be regarded as entities. As used herein, an entity need not be animate. Associative memories work with entities.

The different illustrative embodiments can take the form of an entirely hardware embodiment, an entirely software embodiment, or an embodiment containing both hardware and software elements. Some embodiments are implemented in software, which includes but is not limited to forms such as, for example, firmware, resident software, and microcode.

Furthermore, the different embodiments can take the form of a computer program product accessible from a computer usable or computer readable medium providing program code for use by or in connection with a computer or any device or system that executes instructions. For the purposes of this disclosure, a computer usable or computer readable medium can generally be any tangible apparatus that can contain, store, communicate, propagate, or transport the program for use by or in connection with the instruction execution system, apparatus, or device.

The computer usable or computer readable medium can be, for example, without limitation an electronic, magnetic, optical, electromagnetic, infrared, or semiconductor system, or a propagation medium. Non-limiting examples of a computer readable medium include a semiconductor or solid-state memory, magnetic tape, a removable computer diskette, a random-access memory (RAM), a read-only memory (ROM), a rigid magnetic disk, and an optical disk. Optical disks may include compact disk-read only memory (CD-ROM), compact disk-read/write (CD-R/W), and DVD.

Further, a computer usable or computer readable medium may contain or store a computer readable or computer usable program code such that when the computer readable or computer usable program code is executed on a computer, the execution of this computer readable or computer usable program code causes the computer to transmit another computer readable or computer usable program code over a communications link. This communications link may use a medium that is, for example without limitation, physical or wireless.

A data processing system suitable for storing and/or executing computer readable or computer usable program code will include one or more processors coupled directly or indirectly to memory elements through a communications fabric, such as a system bus. The memory elements may include local memory employed during actual execution of the program code, bulk storage, and cache memories which provide temporary storage of at least some computer readable or computer usable program code to reduce the number of times code may be retrieved from bulk storage during execution of the code.

Input/output or I/O devices can be coupled to the system either directly or through intervening I/O controllers. These devices may include, for example, without limitation, keyboards, touch screen displays, and pointing devices. Different communications adapters may also be coupled to the system to enable the data processing system to become coupled to other data processing systems or remote printers or storage devices through intervening private or public networks. Non-limiting examples of modems and network adapters are just a few of the currently available types of communications adapters.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A specular variable angle absolute reflectometer, comprising:
   a light source;
   a mirror system in a light path of the light source, the mirror system configured to reflect a light beam from the light source towards a sample that is optically reflective;
   a roof mirror disposed in the light path after the sample, the roof mirror configured to reflect the light beam back towards the sample;
   a mechanism connected to the roof mirror, the mechanism being configured to rotate the roof mirror about an axis of the sample;
   a detector in the light path after the roof mirror such that the detector receives light that has been reflected from the roof mirror, thence back to the sample, thence back to the mirror system, and thence to the detector, wherein first and second reflections to and from the sample are coincident;
   a light trap associated with the mirror system, the light trap configured to intercept the light from the light source with a forward movement of the mirror system, and a direct path from the light source to the detector when the mirror system is retracted from intercepting the light; and
   a movement system connected to the mirror system and configured to move the mirror system.

2. The specular variable angle absolute reflectometer of claim 1, wherein the roof mirror comprises a "V" shaped wedge with an inner angle of the "V" shaped wedge facing the sample.

3. The specular variable angle absolute reflectometer of claim 1, wherein the light source comprises a tunable laser.

4. The specular variable angle absolute reflectometer of claim 1 further comprising:
   a polarization controller disposed in the light path between the light source and the mirror system.

5. The specular variable angle absolute reflectometer of claim 4 further comprising:
   a second polarization controller disposed in the light path between the mirror system and the detector.

6. The specular variable angle absolute reflectometer of claim 1, wherein the mirror system comprises a single mirror having a first face on a first side of the single mirror and a second face on a second side of the single mirror, wherein the first face is configured to reflect light from the light source to the sample, and wherein the second face is configured to reflect light from the sample towards the detector.

7. The specular variable angle absolute reflectometer of claim 1, wherein the mirror system comprises a first mirror and a second mirror, wherein the first mirror is configured to reflect light from the light source to the sample, and wherein the second mirror is configured to reflect light from the sample towards the detector.

8. The specular variable angle absolute reflectometer of claim 1, wherein the roof mirror is rotated at a first angle about the sample axis that is about twice an angular distance through with the sample is rotated about the sample axis.

9. A method of measuring a reflectance of a sample having a sample axis, the method comprising:
projecting a light beam from a light source towards a mirror system;
thereafter reflecting the light beam from the mirror system towards the sample, the sample rotated by a first angle about the sample axis;
thereafter reflecting the light beam from the sample towards a roof mirror, the roof mirror rotated by a second angle about the sample axis, the second angle being about twice the first angle;
thereafter reflecting the light beam from the roof mirror back towards the sample;
thereafter reflecting the light beam from the sample back towards the mirror system;
thereafter reflecting the light beam from the mirror system towards a detector, whereby a modified light beam is generated;
limiting a measured foot print to a diameter of the light beam divided by a cosine of an incident angle of the light beam on the sample; and
calculating the reflectance of the sample based on optical properties of the modified light beam as detected by the detector.

10. The method of claim 9 further comprising:
prior to calculating, compensating for source drift and background-introduced errors by sequentially measuring the sample, a power of the light source, and a background error.

11. The method of claim 9 further comprising:
focusing the light beam at the detector to maximize signal and minimize alignment criticality.

12. The method of claim 9 further comprising:
prior to projecting, determining a 100% reflectance level of the roof mirror by measuring a reflectance of the roof mirror using the light source, mirror system, and detector but without the sample.

13. The method of claim 12, wherein calculating the reflectance comprises calculating an absolute reflectance of the sample.

14. The method of claim 13, wherein in calculating the reflectance, a ratio of the reflectance of the sample to the 100% reflectance is an absolute measure of a square of the reflectance of the sample.

15. The method of claim 9 further comprising:
intercepting an output from the light source with a light trap when the mirror system is retracted from intercepting the source beam.

16. The method of claim 9 further comprising:
extracting a source signal from a background by using a chopper disposed at an output of the light source.

17. The method of claim 9 further comprising:
intercepting an output from the light source with a light trap when the mirror system is retracted from intercepting the source beam.

18. The method of claim 9 further comprising:
extracting a source signal from a background by using a chopper disposed at an output of the light source.

* * * * *